United States Patent [19]

Wittkopp et al.

[11] Patent Number: 4,798,963

[45] Date of Patent: Jan. 17, 1989

[54] APPARATUS FOR MONITORING AND MEASURING THE QUALITY OF RAIL WHEEL STILL MOUNTED BENEATH A RAIL VEHICLE WITHOUT DIRECTLY CONTACTING THE RAIL WHEELS

[75] Inventors: Helmut Wittkopp, Erkelenz; Helmut Gruteser, Wassenberg-Birgelen; Wilfred Coenen, Monchen-Gladbach; Walter Elschenbroich, Erkelenz, all of Fed. Rep. of Germany

[73] Assignee: Wilhelm Hegenscheidt Gesellschaft mbH, Erkelenz, Fed. Rep. of Germany

[21] Appl. No.: 893,365

[22] Filed: Aug. 4, 1986

[30] Foreign Application Priority Data

Aug. 12, 1985 [DE] Fed. Rep. of Germany ....... 3528875
Mar. 24, 1986 [EP] European Pat. Off. ......... 86104028.5

[51] Int. Cl.$^4$ ............................................. G01N 21/86
[52] U.S. Cl. ..................................... 250/560; 356/385
[58] Field of Search ................ 250/560, 224; 356/384, 356/385, 386, 387, 376, 1, 4; 364/561, 562, 563

[56] References Cited

U.S. PATENT DOCUMENTS

| | | | |
|---|---|---|---|
| 3,897,156 | 7/1975 | Chasson | 250/560 |
| 3,970,847 | 7/1976 | Wood | 250/234 |
| 4,040,738 | 8/1977 | Wagner | 356/1 |
| 4,181,430 | 1/1980 | Shirota et al. | 356/4 |
| 4,531,837 | 7/1985 | Panetti | 356/394 |
| 4,674,869 | 6/1987 | Pryor et al. | 356/1 |
| 4,678,920 | 7/1987 | Iadipaolo et al. | 250/560 |

FOREIGN PATENT DOCUMENTS

1815689 7/1970 Fed. Rep. of Germany .

*Primary Examiner*—David C. Nelms
*Assistant Examiner*—Jessie Ruoff
*Attorney, Agent, or Firm*—W. G. Fasse; D. H. Kane, Jr.

[57] ABSTRACT

The quality of rail wheels still attached to a rail vehicle or removed from the rail vehicle, is automatically monitored and measured for correction purposes as a rail vehicle or even an entire train passes through a measuring range. The measuring range includes auxiliary rails providing a running or reference plane, at least one diameter sensing device and at least one wheel tread profile quality sensing device. Both sensing devices can perform their function while a wheel or wheels are travelling through the measuring range. Signals provided by the sensing devices are supplied to signal processing and evaluating circuits which may provide a signal record and/or control signals for a wheel truing operation.

56 Claims, 22 Drawing Sheets

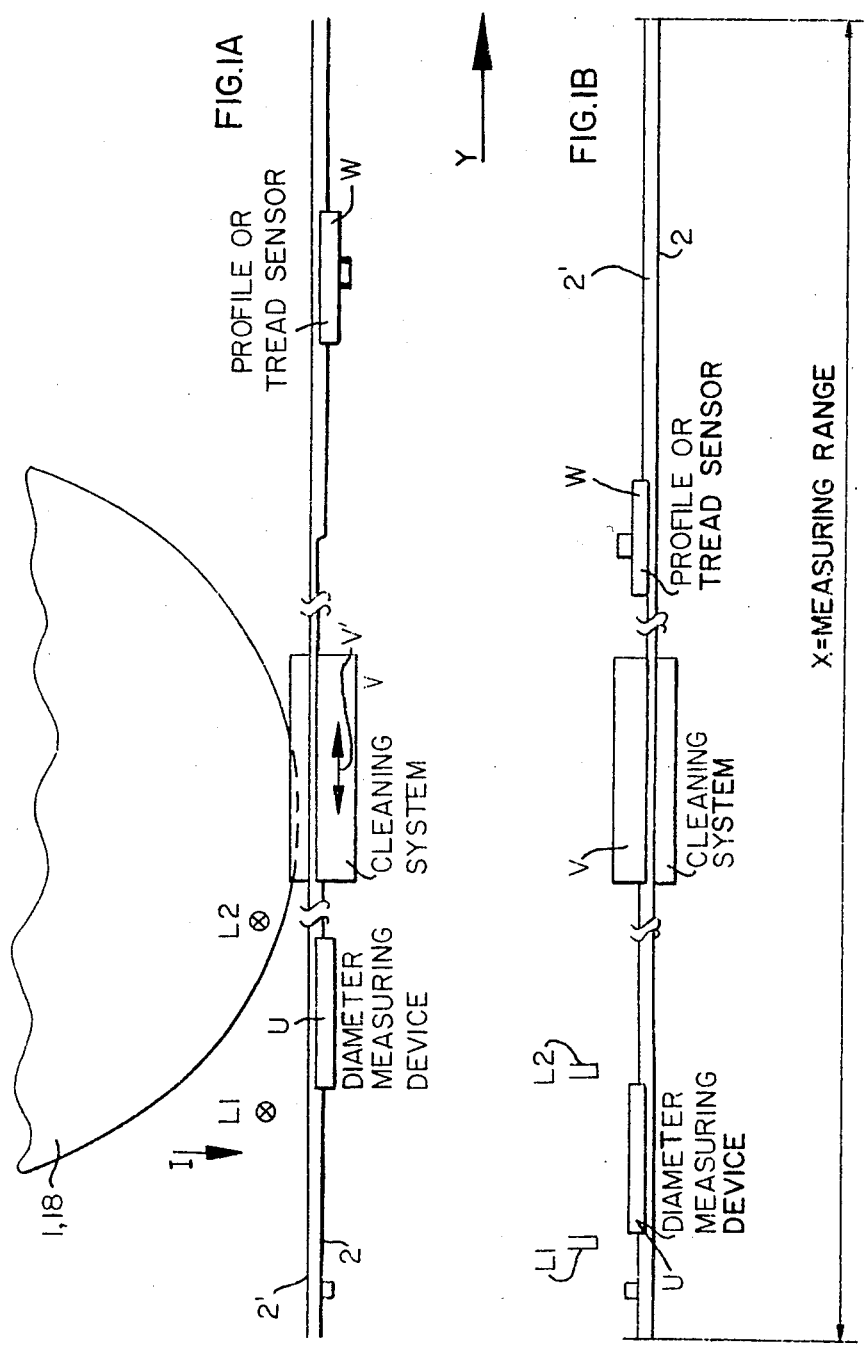

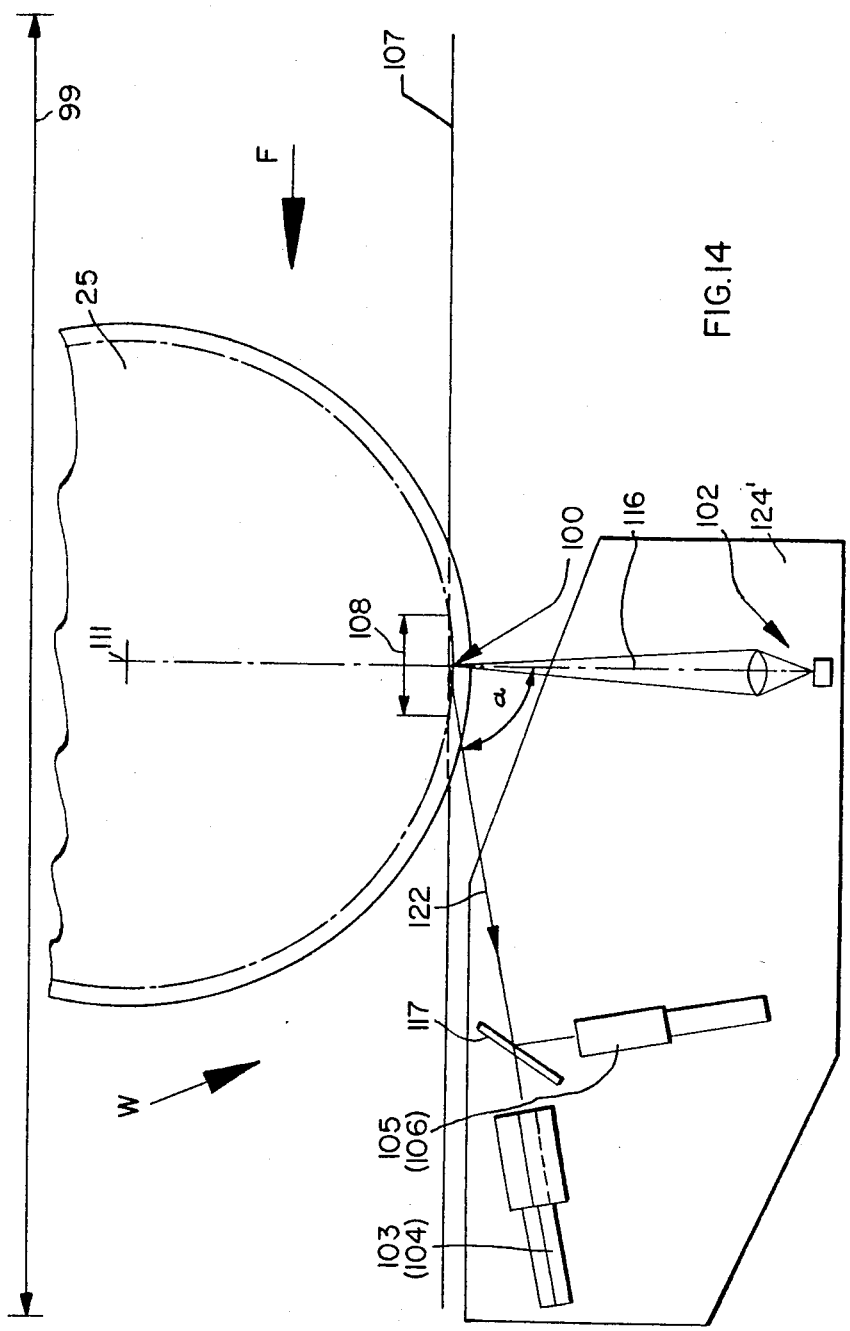

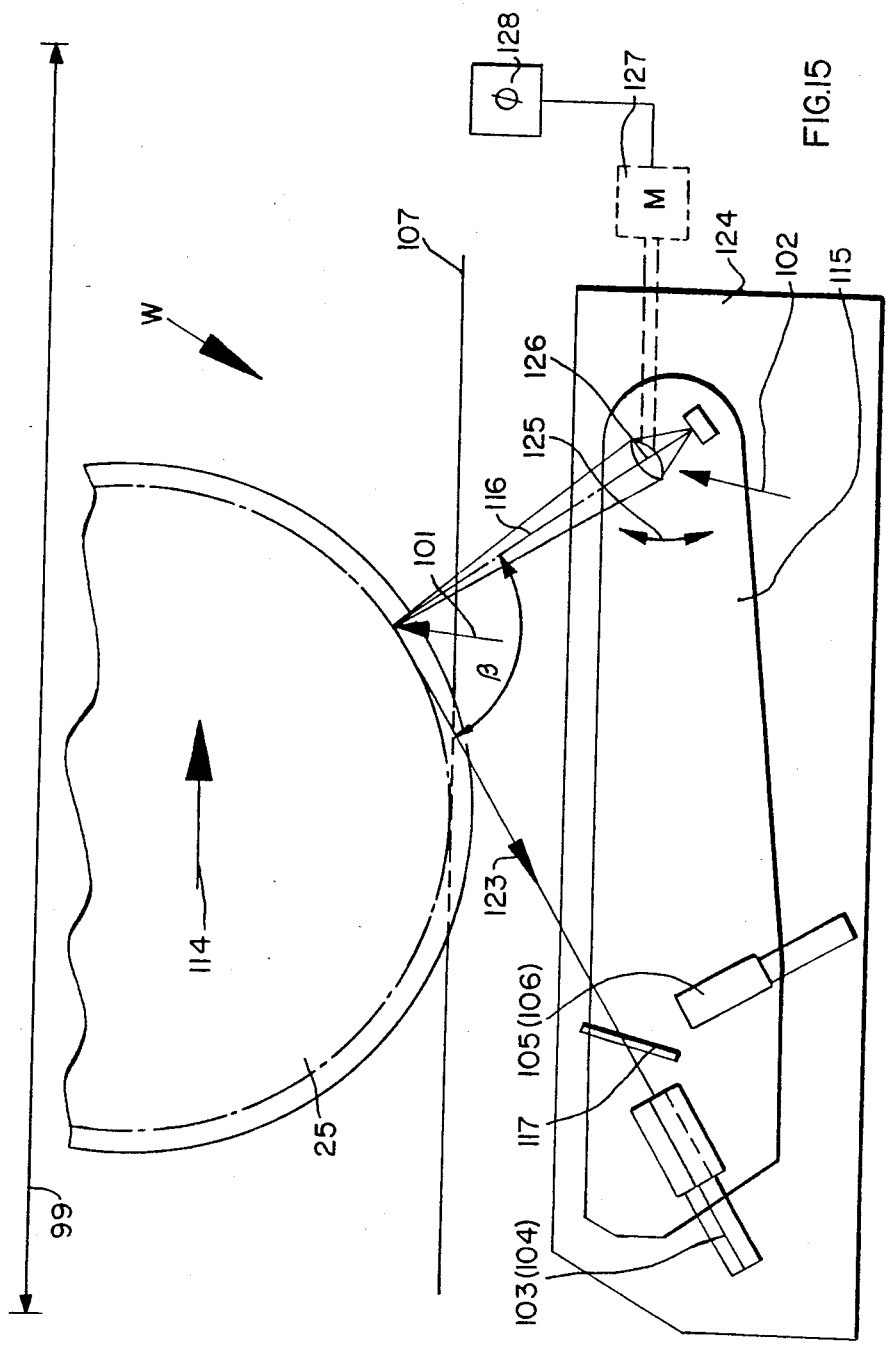

APPARATUS FOR MONITORING AND MEASURING THE QUALITY OF RAIL WHEEL STILL MOUNTED BENEATH A RAIL VEHICLE WITHOUT DIRECTLY CONTACTING THE RAIL WHEELS

CROSS-REFERENCE TO RELATED APPLICATION

The present application relates to U.S. Ser. No. 876,266, filed in the U.S.A. on June 19, 1986, entitled: "METHOD AND APPARATUS FOR MEASURING THE DIAMETER OF WHEELS, ESPECIALLY RADILROAD WHEEL SETS".

1. Field of the Invention

The invention relates to an apparatus for monitoring and measuring the quality of rail wheels, especially wheels still attached to or mounted beneath a rail vehicle and even rail vehicles forming an entire railroad train. Each wheel normally is part of a wheel set.

2. Description of the Prior Art

Systems for monitoring and measuring the quality of rail wheels are known. For example, German Patent Publication (DE-OS) No. 1,815,689 describes such a system. However, in the prior art the wheel or wheel set still attached to a vehicle must be stopped and positioned over an under-floor measuring device. The wheel additionally must then be rotated while the rail vehicle is stationary. Only under this condition is it possible to measure or sense the quality of the wheel or wheel set. When the mesuring is completed, the wheel set must be removed from the measuring system and placed back on the regular track.

OBJECTS OF THE INVENTION

In view of the foregoing it is the aim of the invention to achieve the following objects singly or in combination:

to provide a rail wheel quality monitoring and mesuring apparatus capable of ascertaining the wheel quality even while the wheels are still mounted beneath a rail vehicle and without stopping the vehicle for measuring or scanning the wheels at least with regard to their diameter and with regard to the quality of the wheel profile;

to construct the apparatus in such a way that it is also capable of measuring or monitoring individual wheels or wheel sets even if they have been removed from a rail vehicle;

to selectively monitor and measure individual wheels of a rail vehicle or train or all the wheels of a vehicle or train;

to provide a display and/or record of the data ascertained as a result of the measuring or sensing of the wheel quality and to make it possible to use such data for the control of subsequently performed correction steps such as a wheel truing operation;

to make sure that dirty wheels will not provide faulty or inaccurate measurements;

to provide a relative motion between the wheel or wheel set and the measuring or sensing devices either by keeping the sensing devices stationary and moving the wheel or wheel set or by keeping the wheel or wheel set stationary and moving the sensing devices;

to employ laser beams for the measuring and sensing operations to thereby avoid a direct wheel contact for the measuring and sensing; and to form a sensing circle around an entire wheel or to form certain sensing zones on specified circumferential surface areas of a wheel.

SUMMARY OF THE INVENTION

The apparatus according to the invention is characterized by a measuring range in the track over which a rail vehicle will travel. The measuring range has auxiliary rail means forming running surfaces, whereby the auxiliary rail means are connected to the normal track or are connectable to the normal track. At least one diameter measuring device and at least one profile quality sensing device are arranged in the mesuring range. Both devices perform the respective measuring or sensing during the motion of a railroad wheel relative to the devices or vice versa, whereby both devices are connected to respective data processing and signal evaluating means.

It is an important advantage of the invention that a complete train can travel through the measuring range, possibly with reduced speed for monitoring individual or even all wheel sets of the train regarding their diameter and regarding the quality of the wheel profile or tread. The signals provided by the diameter sensing device and by the profile quality sensing device are supplied to the evaluating signal processing means which, for example, provide a display on an indicator or on a display screen or on a print-out. The evaluating device may also, or in the alternative, provide control signals for operating an under-floor profile correcting machine such as a truing machine which is arranged below the same track to take over any defective wheel or wheel set for performing the required correctional work.

The apparatus of the invention is also suitable for sensing a wheel or wheel set which has been removed from a rail vehicle and it is not essential whether individual wheels or wheel sets are being measured or monitored.

BRIEF DESCRIPTION OF THE DRAWINGS

In order that the invention may be clearly understood, it will now be described, by way of example, with reference to the accompanying drawings, wherein:

FIGS. 1A is a schematic side view of an apparatus according to the invention;

FIG. 1B is a top view in the direction of the arrow I in FIG. 1A;

FIG. 14 and 14a are schematic side views of two versions of another embodiment of a profile or tread sensing device according to the invention;

FIG. 14a is a view similar to that of FIG. 14, but showing the use of light conducting fibers for supplying the reflected light to different sets of cameras;

FIG. 15 illustrates a modification of the tread or profile sensing device according to FIG. 14;

Figure 1C:
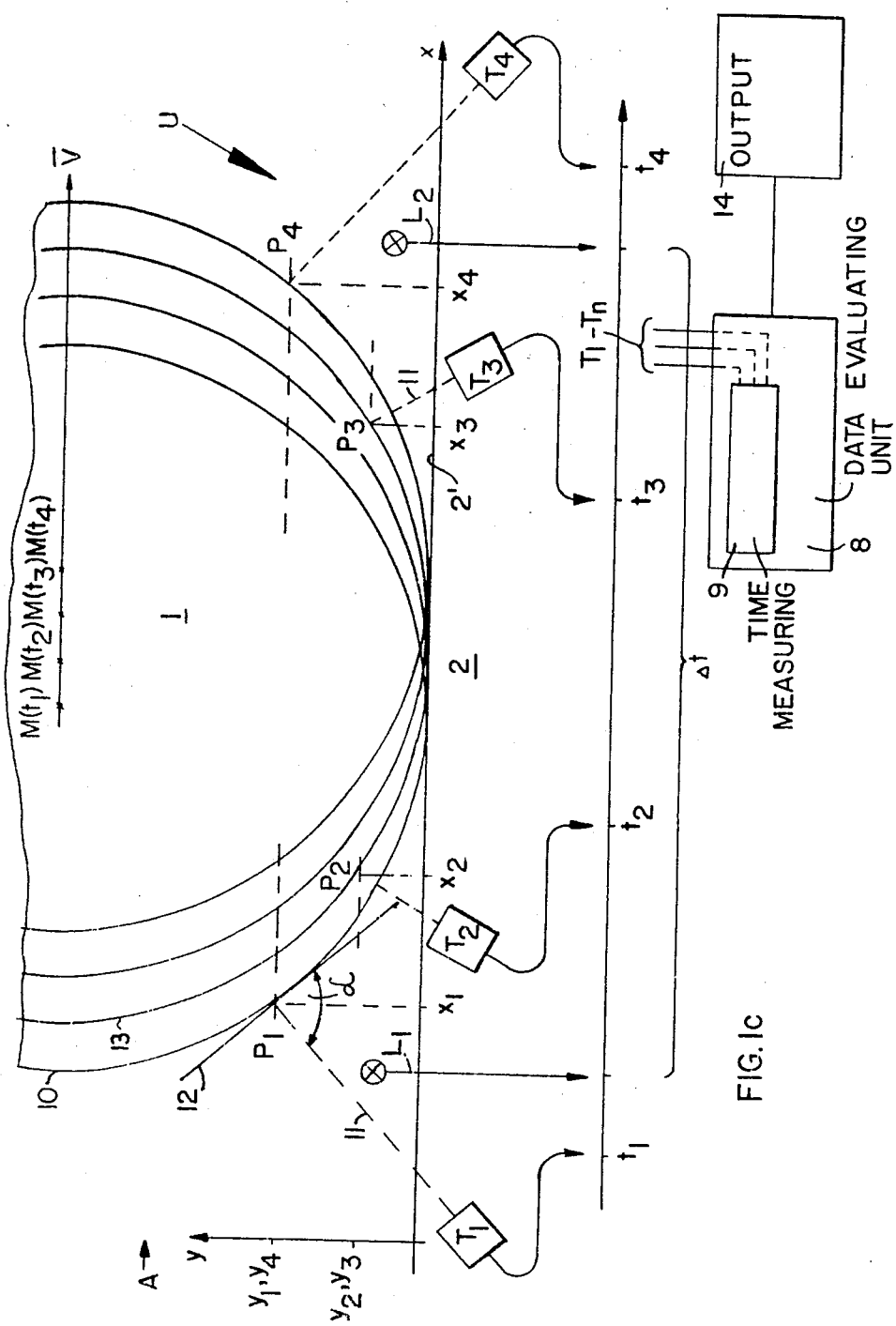
FIG. 1C is a view similar to that of FIG. 1A, however, showing several wheel positions and illustrating a diameter measuring range.

DETAILED DESCRIPTION OF PREFERRED EXAMPLE EMBODIMENTS AND OF THE BEST MODE OF THE INVENTION

FIGS. 1A and 1B illustrate the schematic arrangement of the entire system according to the invention, comprising the main structural unit U which is a diameter measuring device, a cleaning system V, and a profile or tread quality sensor W. Only one wheel 1, 18 of a wheel set is shown passing through the measuring range X in the direction of the arrow Y. The cleaning system V is of conventional construction and cleans the circumferential surface of the wheel 1, for example, by a compressed air jet. For this purpose the cleaning system V or at least its cleaning output means move along with the wheel for a sufficient length to clean the circumferential surface of the wheel. The movement of the cleaning system is indicated by the arrow V'. Normally, it will be sufficient to clean the rim of the wheel and the transition zone between the rim and the tread surface. A sand blasting or particle blasting system could also be used for this purpose and operated in a closed circuit for recirculating the cleaning sand or particles. However, a cleaning system using brushes would also be suitable. The measuring range X extends along a rail 2 defining a running surface 2' for the wheel 1. The light sources or laser beam generators forming barrier beams L1 and L2 are part of the diameter measuring device U.

One embodiment of the diameter measuring device U will now be described with reference to FIG. 1C, whereby the wheel 1 of a wheel set 7 rolls through the measuring range X in the direction of the arrow A. A measuring distance within the measuring range X is defined by barrier beams L1 and L2. Each beam barrier may be produced by a light source or laser beam generator 3 cooperating with an optical receiver 4 shown in FIG. 2. Within the measuring distance defined by the beam barriers L1 and L2, there are arranged photoelectric sensors or scanners T1, T2, T3, and T4 placed below the running surface 2' of the rail 2 and operating in a contactless manner. These photoelectric scanners are of conventional construction and may be adjusted to recognize an object at a fixed distance. Such scanners or sensors may, for example, transmit infrared light at an angle to the axis of incidence so that the axis of incidence is intersected by the transmitted light beam. It is possible to adjust this point of intersection if necessary. If a reflecting object enters into the point of intersection, the transmitted light is reflected by the surface in the intersection to be registered by a photoelectric sensor of a respective receiver. An object is only then recognized when it is present at the intersection of the optical axis of the light transmitter and the optical axis of the light receiver. Such an intersection forms a scanning point. The receiver is so constructed that light having a determined intensity and coming from a given distance triggers an electrical circuit for producing a signal signifying that an object is present at a predetermined location, namely, at the scanning point.

Figure 2:
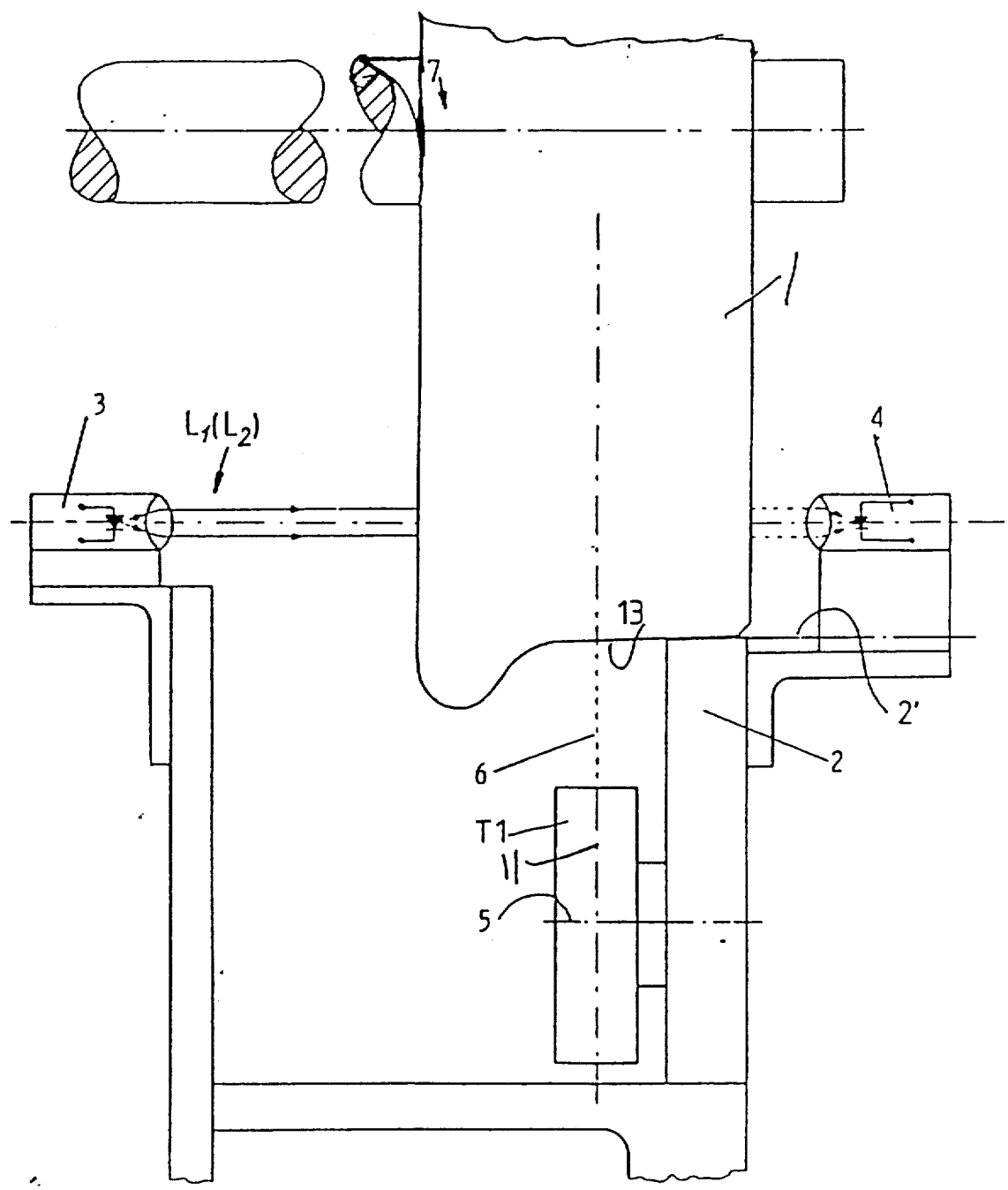
FIG. 2 is a view in the direction of the arrow A in FIG. 1C.

The diameter of the wheel 1 is determined in a defined measuring plane 6 shown in FIG. 2. The photoelectric sensors T1, T2, T3, T4 are therefore arranged below the running surface or plane 2' in such a position relative to the measuring plane 6 that the main scanning direction 11, shown in FIG. 1C, is so located that a measurement can be made within the measuring plane 6. Accordingly, the measuring plane 6 intersects the wheel 1 so that the outer circumferential surface of the wheel in this measuring plane 6 defines a measuring circle 10.

As shown in FIG. 1C each of the photoelectric sensors T1 to T4 arranged below the running surface 2', is so oriented that its main scanning direction 11 extends perpendicularly, or at least approximately perpendicularly, to a tangent 12 on the measuring circle 10 in the respective scanning point P1, P2, P3 and P4. In this manner it is possible that certain diameter variations or differences from wheel to wheel are acceptable since such variations or differences will not impair the accuracy of the measured result in an unpermissible manner.

The sensors T1 to T4 may be mounted on an axle 5 for a tilting adjustment movement. The sensors T1 to T4 are arrestable or fixable in an adjusted position. Thus, it is possible to train the sensors individually or the entire measuring system onto wheels having another diameter range. A tilting motion about the axle 5 varies the angular position of the main sensing or scanning direction 11, whereby the position of the respective sensing or scanning point P1 to P4 is changed correspondingly.

The light barriers L1 and L2 as well as the optical sensors T1 to T4, are connected to a time measuring device 9 which ascertains the points of time at which the light barriers L1 and L2 as well as the optical scanners or sensors T1 to T4 are activated. These points of time are stored in an intermediate memory and later evaluated by a signal evaluating or signal processing device 8 for use in the subsequent speed determination and diameter determination.

If the measuring system is properly trained or aligned, a measuring operation proceeds as follows. The measuring of only one wheel 1 of a wheel set 7 will be taken into account. The wheel 1 runs with a section of its tread surface or profile 13 on a rail 2, the upper surface of which forms the running plane 2' as mentioned. Thus, the wheel 1 travels in the direction of the arrow A in FIG. 1C toward the light barrier L1. The leading part of the wheel tread surface shown in the right-hand portion of FIG. 1C, activates the light barrier L1. The activation of the light barrier L1 may trigger a time measuring device or the point of time at which triggering takes place is recorded by a continuously running time measurement device. The point of time which has been ascertained as just mentioned, is stored in an intermediate memory. After the wheel has passed through the measuring distance between the two light barriers L1 and L2, the same leading portion of the wheel 1 will activate the light barrier L2 and again a point of time marking the activation of the light barrier L2 is stored in an intermediate memory. With the aid of these two points of time, it is now possible to calculate, for example, in the evaluating device 8, how much time the wheel 1 needed to pass, or rather, roll from the light barrier L1 to the light barrier L2. The distance between these two light barriers is known and it is thus possible to use this known distance and the measured time for calculating the speed of the wheel.

As the wheel 1 moves from left to right in the direction of the arrow A in FIG. 1C on the runnung surface 2' of the rail 2, the left hand tread portion shown at 13 in FIG. 1C comes into the area of the sensing or scanning point P1, thereby triggering the photoelectric sensor T1, thereby setting the time marker t1.

In FIG. 1 the running surface 2' constitutes the abscissa or x-coordinate of a rectangular coordinate system. The coordinates of the measuring points in the y-direction, namely y1, y2, y3, and y4 are marked on the ordinate. The photoelectric sensors T1 to T4 have fixed positions in the measuring systems and therefore, the scanning points P1, P2, P3 and P4 also have fixed x- and y-coordinates. Thus, when the point P1 causes the first time marker t1, it is known that the wheel has passed through the point P1 having the x-coordinate x1. As a result, point xi and the corresponding time marker ti have a fixed relationship relative to each other.

As the wheel 1 continues to travel in the direction of the arrow A as shown in FIG. 1C, the wheel passes through the sensing point P2 having the y-coordinate y2 and the photoelectric sensor or scanner T2 at the x-coordinate x2 thereby setting the second time signal t2.

Two further photoelectric sensors T3 and T4 are arranged on the other side of a central plane extending perpendicularly to the x-axis and perpendicularly to the plane of the drawing of FIG. 1C. The sensors T3 and T4 are arranged in the same way as the sensors T1 and T2 relative to the wheel, however mirror symmetrically to the sensors T1 and T2. Thus, the respective sensing angle is inclined in a direction opposite to the direction of the sensing angle for the sensors T1 and T2. The sensors T3 and T4 direct their sensing beam toward the oncoming wheel 1. The wheel passes with its tread surface 13 through the sensing point P3 in the measuring plane. This sensing point P3 of the sensor T3 has the coordinates y3 and x3. When the sensor T3 senses a reflected light a third time marker t3 is set.

In the same way the sensor T4 establishes a sensing point P4 having the coordinates y4 and x4. Coordinates y2 and y3 are the same and so are coordinates y1 and y4. When the wheel tread surface coincides with the sensing point P4 a fourth time marker t4 is set.

Figure 3:
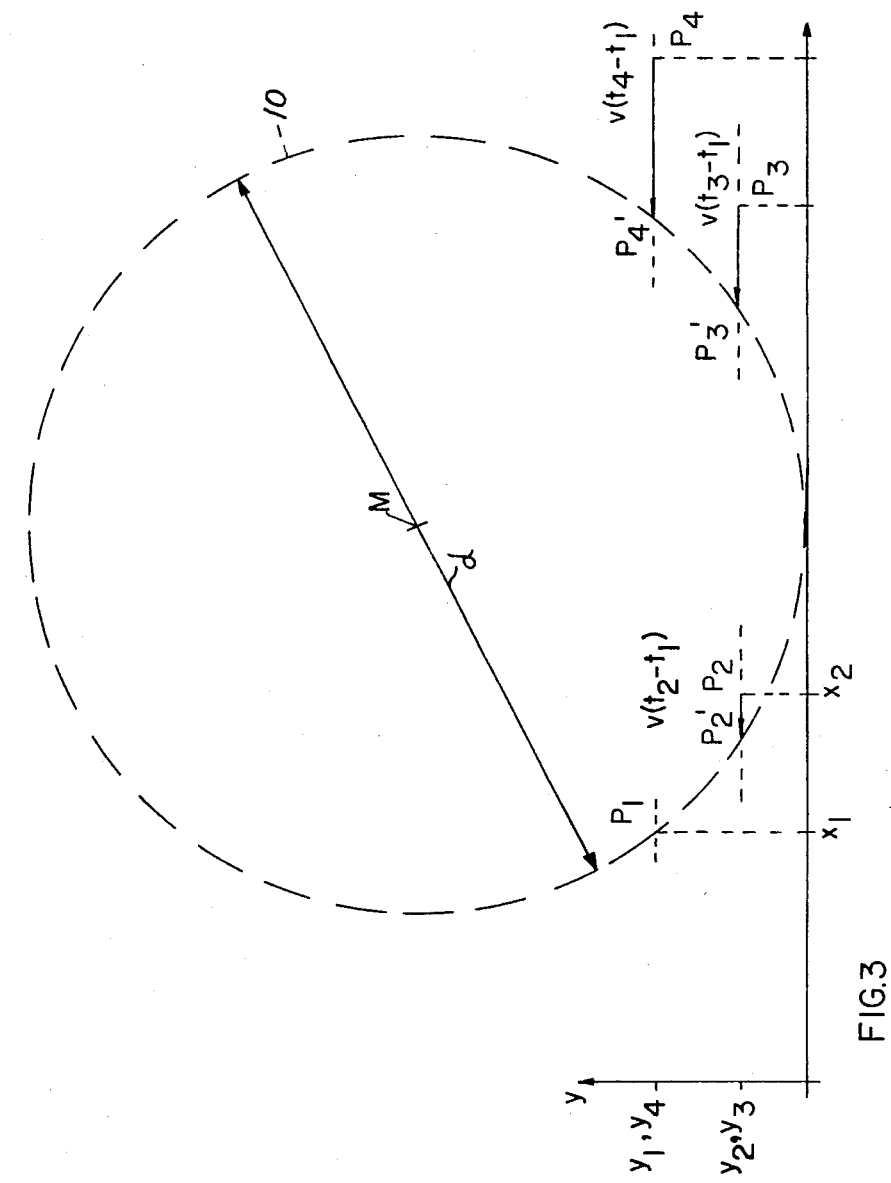
FIG. 3 is a schematic view similar to that of FIG. 1C illustrating the calculation of the wheel diameter to be ascertained.

For determining the diameter of a circle, it is sufficient to have three points provided that the location of these three points is known. Thus, in the example embodiment, one could use the points P1 and P4 and the point of contact between the measuring circle 10 and the running plane 2'. This point of contact may be considered to be located in the measuring plane 6, shown in FIG. 2, because the tread or profile of the wheel is known. Thus, the diameter d of the measuring circle 10 could be ascertained as shown in FIG. 3. It will be noted that the points P1 and P4 in FIG. 1C are not located on the measuring circle 10 due to the motion of the wheel 1. The speed of the wheel and the location of these points, however, is known so that it is possible to displace the coordinate on the abscissa of the point P4, or of the point P1 in a way as if the wheel had not moved. The coordinate value of the ordinate y remains the same. Assuming that the coordinate values y1 and x1 remain constant, it can now be ascertained with the aid of the data evaluating unit 8 which time has passed between the two time markers t1 and t2. As a result, by multiplying the speed of the wheel with the time that passed between t1 and t2, it is possible to shift the point P2 back to a position P2' in which it would be if the wheel had not rolled. Point P2' is shown in FIG. 3. The computer forming part of the data evaluating unit 8 determines the location or coordinates of the point P2' as just explained. The same operation is performed for the sensing points P3 and P4 to determine respective points P3' and P4', please see FIG. 3.

Thus, in the computer there are now available four points P1, P2', P3', and P4' in addition to the point of contact between the wheel 1 and the running surface 2'. The x and y coordinates of all these four points are known. Accordingly, three points out of the known points may now be selected to calculate the diameter d of the circle 10. If desired, it is even possible to use all available points, whereby the circle is over-determined. However, the diameter d of the measuring circle 10 may still be determined with the aid of the Newton Kantorowitsch method. The calculated result is then supplied to an output device 14 such as a display or a printout. Additionally, the output value may be supplied to other components for further evaluation. Incidentally, it is not necessary to assume P1 to be the fixed point, that is merely convenient. Any other point may be taken to be the fixed point and the respective calculation is then made to shift the other points as explained above.

Figure 4:
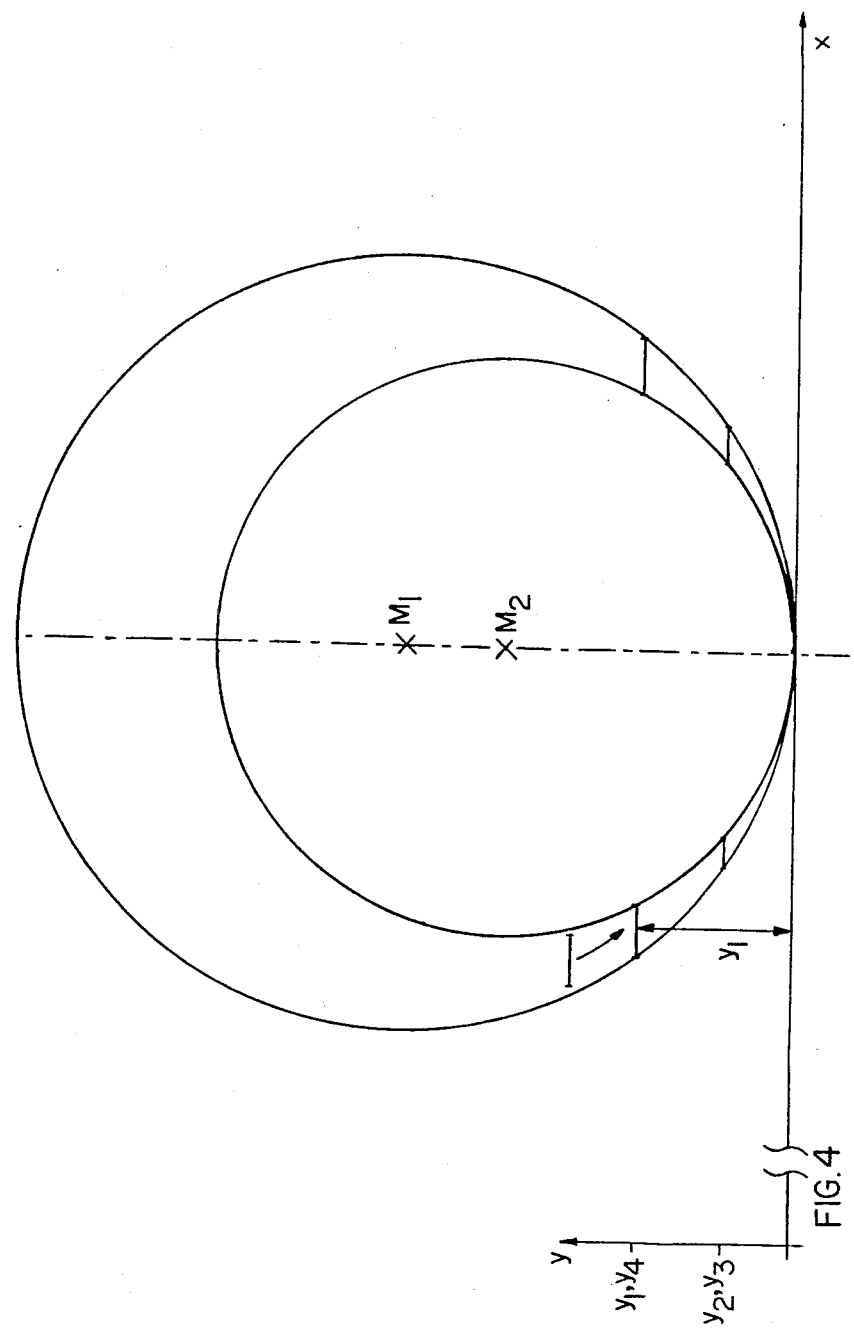
FIG. 4 illustrates the calibration steps for the present apparatus.

The measuring device is adjustable in a simple manner by using, for example, two standard wheel sets having a known reference diameter. These standard or reference wheel sets shall have a cylindrical profile or tread, whereby the diameter of one wheel should represent the upper limit and the diameter of the other wheel should represent the lower limit of the measuring range of the system. These known diameters are stored in the memory of the computer. After the standard wheel sets have passed through the measuring range, the computer has available four displacement distances which are formed with the aid of the time markers t1 to t4 and a fifth point of time represented by the passage of the center of a wheel of the standard wheel set through the center line of the measuring system. Such center line may be a vertical line passing centrally through the arrangement as shown in FIG. 4, thereby symmetrically dividing the sensors t1 and t2 on the one hand from the sensors t3 and t4 on the other hand. This central point of time may be determined by the exit of the standard wheel out of the first light barrier L1 and the entry of the wheel into the second light barrier L2. This central point of time is the same for both standard wheel sets and it is independent of the wheel diameter. Accordingly, it provides the connecting link between the rolling of the smaller standard or reference wheel through the measuring distance and the rolling of the larger standard wheel through the measuring distance. The calibration is now performed in that the computer calculates displacement difference distances resulting from the displacement distance of the sensor T1 in the first calibration minus the displacement distance of the first sensor T1 in the second calibration and so on. Thus, each sensor T1 to T4 is represented by a given distance between the measuring points of a larger wheel and the measuring points of a smaller wheel as shown in FIG. 4. These distances extend in parallel to the x-axis and intersect the larger and smaller wheel as shown. The respective intersections provide the corresponding x- and y-coordinates of the sensing point, whereby the x values are obtained by the above described figuring back of the response points of time. This method makes it possible to calibrate the measuring system in a simple manner by a program incorporating the just described calculations. Such a calibration procedure makes the adjustment and checking of the measuring system simple, especially with regard to aging and environmental influences which may occur in the practical operation of the measuring system.

The described and claimed system according to the invention makes it possible for the first time to measure wheels which are part of wheel sets still attached to a rail vehicle while the vehicle passes on a rail through the measuring system. The components of the measuring system such as the data evaluating unit and the output device, as well as the time measuring device, are of conventional construction. The data evaluating unit 8 may, for example, be of the type SAM 68K, KWS Computersystems GmbH, 7505 Ettlingen. The time measuring device 9 may, for example, be of the type of SN74LS 160 comprising Latch-register SN74LS374 and oscillator MTU clock 1 MHz, National Semiconductor and Motorola. The output unit 14 may, for example, be of the type of NEC pinwriter P2 KWS Computersystems GmbH, 7505 Ettlingen.

Incidentally, it is not essentially that the wheel actually rolls through the measuring system. It is sufficient if the wheel slides through the measuring system. In any event, the wheel must pass through the measuring system.

Figure 5:
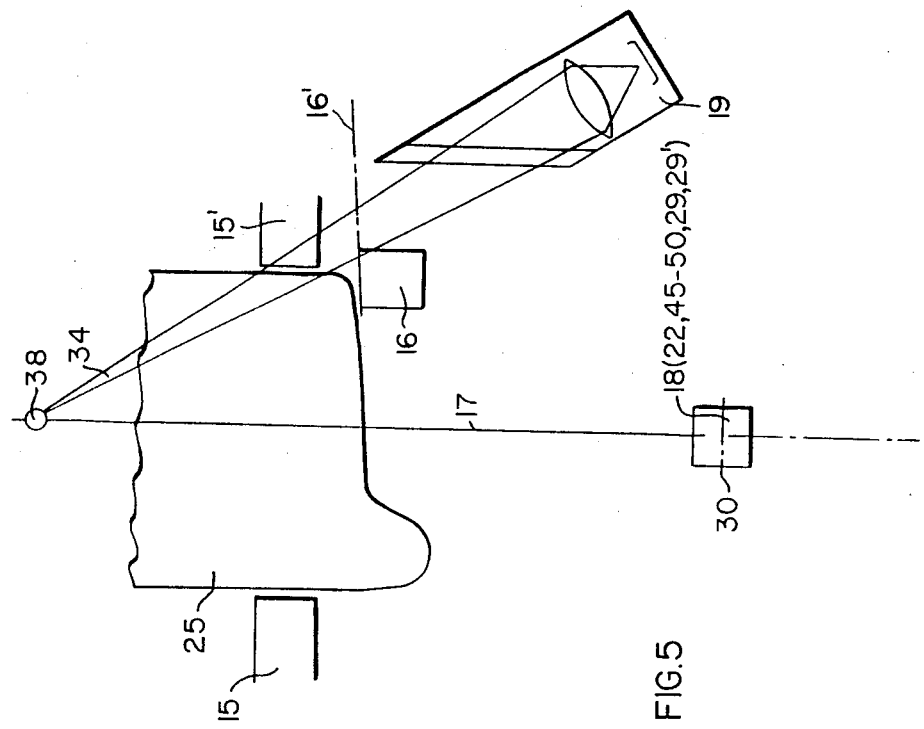
FIG. 5 is a view in the direction of the arrow B in FIG. 8 or in the direction of the arrow C in FIG. 9.

A simple embodiment of a measuring system U will now be described with reference to FIG. 9 for ascertaining the diameter d of a wheel 25 forming part of a wheel set having an axle 36 shown in FIG. 7. The wheel 25 rolls on a rail 16, the upper surface of which forms the rolling plane 16', please see FIG. 5. The wheel rolls in the direction of the arrow C with an unknown rolling speed. As shown in FIG. 5, the wheel 25 is guided laterally by lateral guide members 15 and 15' keeping the wheel on the rail 16.

The diameter d of the tread surface of the wheel 25 shall be measured in the measuring plane 17 shown in FIG. 5 and corresponding to the respective plane 6 shown in FIG. 2. A laser beam generator 26 shown in FIG. 9 is located below the rail 16 generating a beam 37 parallel to the rail 16. The beam 37 passes through a beam splitter 31 which deflects a partial beam 26" perpendicularly to the direction of the beam 37. Thus, the beam 26" is directed upwardly in the measuring plane 17 which may be assumed to be represented by the plane of the drawing sheet of FIG. 9. The beam 26" forms a light barrier in the measuring plane 17. The portion of the beam 37 passing through the splitter 31 is directed onto a deflector 32 which is located at a fixed distance c from the beam splitter 31. This fixed distance c is, for example, smaller than the expected wheel diameter d. The deflector mirror 32 deflects the beam by 90° upwardly to form a second beam 26' extending in parallel to the first deflected beam 26". Both beams extend in the measuring plane 17.

Figure 9:
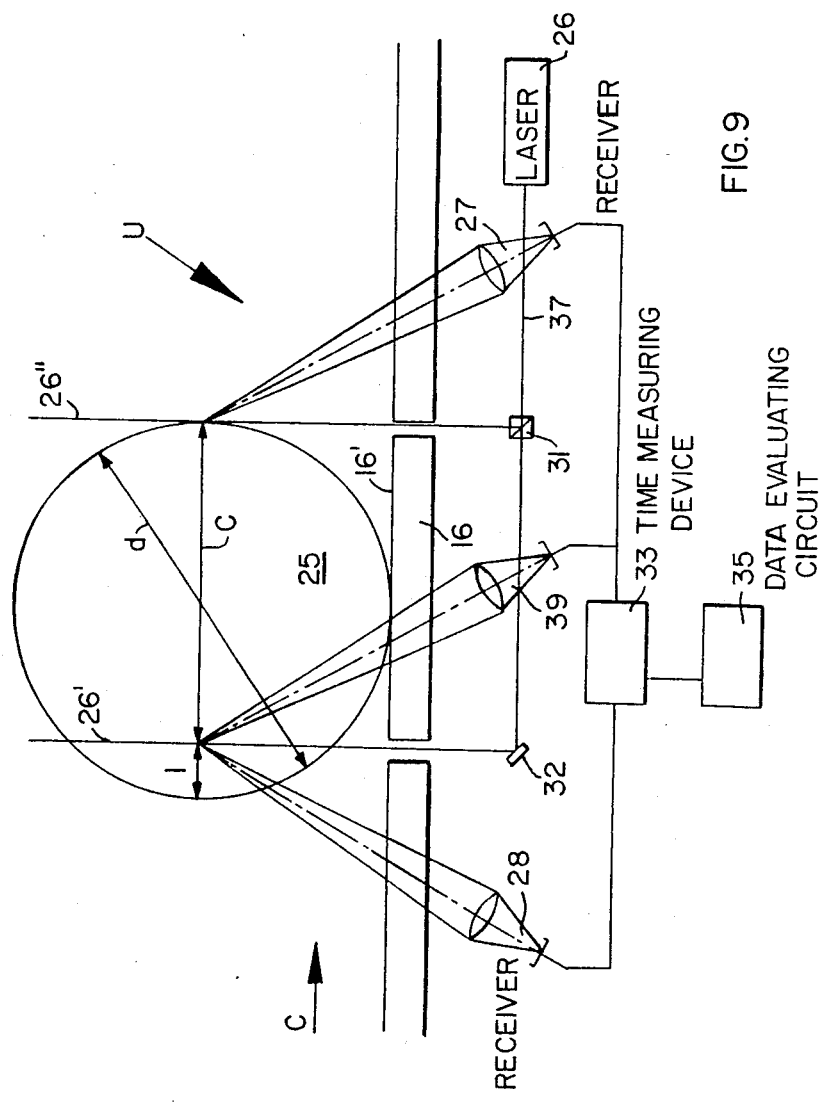
FIG. 9 illustrates the schematically the diameter measuring device used according to the invention.

Assuming that the wheels 25 rolls with a constant speed V in the direction of the arrow C in FIG. 9 on the running plane 16', the wheel will first pass with its leading portion of its tread surface through the beam 26'. The tangent point is located within the expectation range or zone 38, please see FIG. 5. As the light beam 26' contacts the wheel, diffuse light is remitted or reflected and received by the receiver optical means 39 providing a respective signal to a time measuring device 33 to set a first time marker. This first time marker may either start a time measuring device, or it may mark the beginning of a count within a continuous counting time measuring device. In other words, the point of time when the receiver 39 provides a received signal is stored in a memory.

The wheel 25 continues to roll with a constant speed V in the direction of the arrow C to contact the beam 26" after passing through the fixed distance c. Here again, the receiver optical means 27 will receive diffuse, remitted, or reflected light to provide a second time marker signal for the time measuring device 33. A computer or data evaluating device 35 connected to the time measuring device 33 can now calculate the time needed by the wheel for passing through the distance c, thereby also calculating the wheel speed V which is then stored in the memory of the computer 35.

As the wheel continues to roll in the direction of the arrow C both beams 26' and 26" will be interrupted provided that the distance c is smaller than the wheel diameter d. When the wheel has also passed through the distance l the beam 26' will become a tangent to the rear portion, so to speak, of the tread surface of the wheel, whereby again light is remitted or reflected in a diffuse manner so that the receiver optical means 28 will receive this light. The distance l depends on the wheel diameter $(d-c=l)$. Additionally, the speed of the wheel is known. Thus, the distance l may now also be calculated by multiplying the known speed with the time needed by the wheel for passing through the distance l. The evaluating computer 35 is equipped to perform this calculation. By adding the calculated distance l to the known distance c the diameter d is available.

Figure 6:
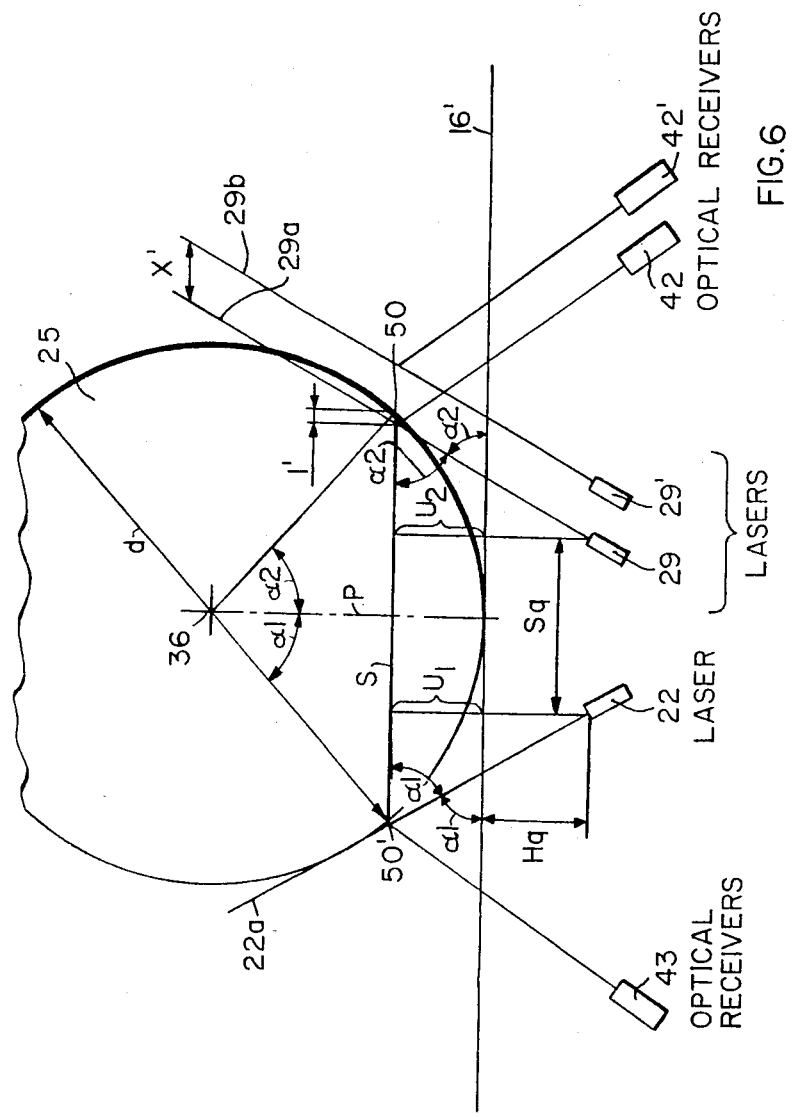
FIG. 6 illustrates schematically the optical scanning according to the invention.

The system shown in FIG. 3 is sufficient to determine the wheel diameter and such system does not need to be fixed in one location. Rather, it could be located on a measuring carriage not shown. Reference is made in this connection to the above mentioned copending application U.S. Ser. No. 876,266. When the carriage moves past the wheel, the wheel can be stationary. It does not matter whether the carriage moves in the direction of the arrow C in FIG. 9 or in the opposite direction. If desired, the carriage may be equipped with a conventional distance measuring device. In that case it is not necessary to measure the speed of the measuring carriage, but only the distance travelled by the measuring carriage, whereby the beginning and the end of this distance is determined by the tangential contact of the wheel circumference with respective light barriers or beams. In the system according to FIG. 9 it would be sufficient to just use the beam 26' and the two receivers 28 and 39 for measuring the distance travelled. If the measuring device, or rather the carriage, moves in the direction of the arrow C in FIG. 9, and the wheel is stationary, then first the receiver 28 is activated which in turn activates the distance measuring device through the evaluating unit 35. When the distance corresponding to the diameter d has been passed. The receiver 39 generates a signal and the distance measuring device is stopped. The data evaluating unit or circuit 35 then can calculate the diameter. Where it is necessary to use inclined beams as, for example, shown in FIG. 6, then at least two such beams must be used. The respective beam generators 22, 29 are shown in FIG. 6.

However, it is desirable to determine the speed of the wheel 25 during passing through the distance l as precisely as possible. Therefore, the speed determination should take place as close as possible to the distance l. A third beam should then be provided to the right of the beam 26' and parallel to the beam 26". The optical receiver 39 must then be arranged so as to receive diffuse reflected or remitted light from the point of the wheel circumferential surface where the additional third beam becomes a tangent to the wheel 25. The spacing between the third beam and the beam 26" would then be in the order corresponding to the diameter dependent spacing 1. This order is known because the smallest diameter and the largest diameter of the wheels that are to be measured, are also known. Thus, as the wheel passes through the distance l between the two beams 26" and the beam extending parallel thereto, it is possible to determine the speed of the wheel, whereby a higher certainty and a better precision is achieved in the calculation of the distance l.

The sensitivity of the several receiver optical means is to be such that the respective expectation range is completely scanned by the respective optical receiver. The expectation range 38 is shown in FIG. 5 and is that surface area on the circumferential surface of the wheel 25 which is covered or scanned by the beam when the smallest wheel diameter is to be measured and when the largest wheel diameter is to be measured. If the scanning range does not correspond to the expectation range 38 then the measuring range must be narrowed in accordance with the scannable expectation range, whereby the respective receiver optical means must be calibrated or adjusted again when the range is exceeded or not reached.

In the structural embodiment of an apparatus according to the invention it is necessary that the light or laser beams are not interrupted. For example, in FIG. 5 it is necessary that the lateral guide rail 15' has a gap for the beam passage or the rail 15' is so located as to not interfere with the respective beams.

FIG. 5 is basically a view in the direction of the arrow C in FIG. 9. The laser 18 shown in FIG. 5 essentially corresponds to the lasers 22, 45 to 50, 29, 29' shown in FIGS. 6, 7, and 8, is tiltable about its axis 30 for adjustment of the beam direction. The beam of the laser 18 extends in the measuring plane 17. However, it is also possible to assume that the laser 18 of FIG. 5 merely corresponds to the beam deflectors 32 of FIG. 9 in which case the view of FIG. 5 corresponds to that situation in FIG. 9 in which the wheel 25 has travelled the distance l so that the beam 26' becomes a tangent to the wheel circumferential surface in the measuring plane 17. The diffuse light remitted in the expectation or tangent zone 38 is then received by the optical receiver 19 and the further signal processing is as described above.

The system shown in FIG. 9 is not suitable for measuring the wheel diameter in those instances where the circumferential surface of the wheel is covered for more than 180°, for example, by brake shoes located in the critical areas. In such an instance the beam cannot become a tangent to the zone 38 signifying the diameter of the wheel rather than a chord. However, even under these operating conditions basically the same measuring station and the same measuring operation can be performed for the desired measurement as will now be explained with reference to FIG. 6.

FIG. 6 shows schematically an apparatus for use when only the lower half of a wheel 25 is accessible for the diameter measurement. The lasers 22, 29, and 29' are so oriented that the respective laser beams 22a, 29a, and 29b can become tangent to the circumferential surface of the lower half of the wheel 25. Only one laser 22 is shown, however, several laser beam generators may be used as shown at 29, 29'. A central plane P extends perpendicularly to the plane of the drawing, that is, to the measuring plane and axially and longitudinally through the wheel axis 36. The plane P which also extends perpendicularly to the rail 2', divides the lasers into two groups. To the left of the plane P only one laser 22 is shown. To the right of the plane P the two lasers 29, 29' are arranged. However, as mentioned, more than one laser 22 may be used. The laser generators are so arranged that the laser beams in one group diverge relative to the laser beams of the other group as shown. The laser beams of the same group extend in parallel to each other as shown by the laser beams 29a and 29b. The angles $\alpha_1$ and $\alpha_2$ are so dimensioned that the respective laser beams can indeed become tangent to the wheel circumferential surfaces without any hindrance by other structural components. However, it is not necessary that the angles $\alpha_1$ and $\alpha_2$ are of equal size.

In FIG. 6 the wheel 25 also travels from left to right in the direction of the arrow A, whereby first the laser beam 22a is encountered. However, since the beam 22a does not become a tangent to the leading point or zone 50 on the circumference of the wheel 25, the laser beam receiver 43 does not receive any reflected light at this time. When the wheel continues on its travel toward the laser beams 29a, 29b the spot or zone 50 becomes a tangent point of contact between the wheel 25 and the laser beam 29a and a little later the laser beam 29b encounters the wheel. Light is now reflected by the zone 50 and first received by the laser optical receiver 42 which provides the first time marker as described above with reference to FIG. 9. As the wheel continues to move through the measuring station, the zone 50' will become a tangent point of contact with the laser beam 22a. At this time diffuse light reflected or retransmitted from the surface of the wheel will be received by the laser optical receiver 43 to provide a second time marker. During this time duration which is ascertained by the signal processing device 35 the wheel has passed through a length 1' which is diameter dependent. However, the speed of the wheel 25 in FIG. 6 has not yet been ascertained.

In the embodiment of FIG. 6 the speed is ascertained with the aid of the further laser optical beam 29b transmitted by the laser 29'. When the laser beam 29b becomes a tangent to the wheel, a third time marker is generated by the diffuse light received by the laser optical receiver 42′. Since the horizontal spacing X′ between the laser bems 29a and 29b is known, it is possible to calculate the speed of the wheel 25 with the aid of the time difference between the time markers generated by the laser optical receivers 42 and 42′. As a result, it is now also possible to calculate the diameter dependent distance l′ in the manner described above with reference to FIG. 9. The diameter d can now be calculated by taking into account the fixed distances Hq and Sq as well as the angles $\alpha_1$ and $\alpha_2$. In this connection it must be taken into account that $\alpha_1$ will differ from $\alpha_2$ if the vertical distance $U_1$ between the horizontal plane defined by the rail 2′ and the spot 50′ differs from the vertical distance $U_2$ of the spot 50 from the horizontal plane defined by the rail 2′. If $U_1$ is equal to $U_2$ then $\alpha_1$ will be equal to $\alpha_2$, whereby the calculation to be explained below is substantially simplified. The line S is a parallel to the rail 2′ through the spot 50 or through the spot 50′. This line will pass through both spots when $\alpha_1$ is equal to $\alpha_2$.

With the speed of the wheel ascertained as described above, and with the time for passing through the distance l′ measured as described above, and with the fixed dimensions Hq and Sq given along with the angles $\alpha_1$ and $\alpha_2$, the diameter d is calculated by the following equation $$d = \frac{V \cdot t + Hq\left(\frac{1}{\tan\alpha_1} + \frac{1}{\tan\alpha_2}\right) + Sq}{2\left[\sin\alpha_1 + \sin\alpha_2 - (1 - \cos\alpha_1) \cdot \frac{1}{\tan\alpha_1} - (1 - \cos\alpha_2) \cdot \frac{1}{\tan\alpha_2}\right]}$$

As mentioned, this equation may be substantially simplified if $\alpha_1$ is equal to $\alpha_2$.

Figure 7:
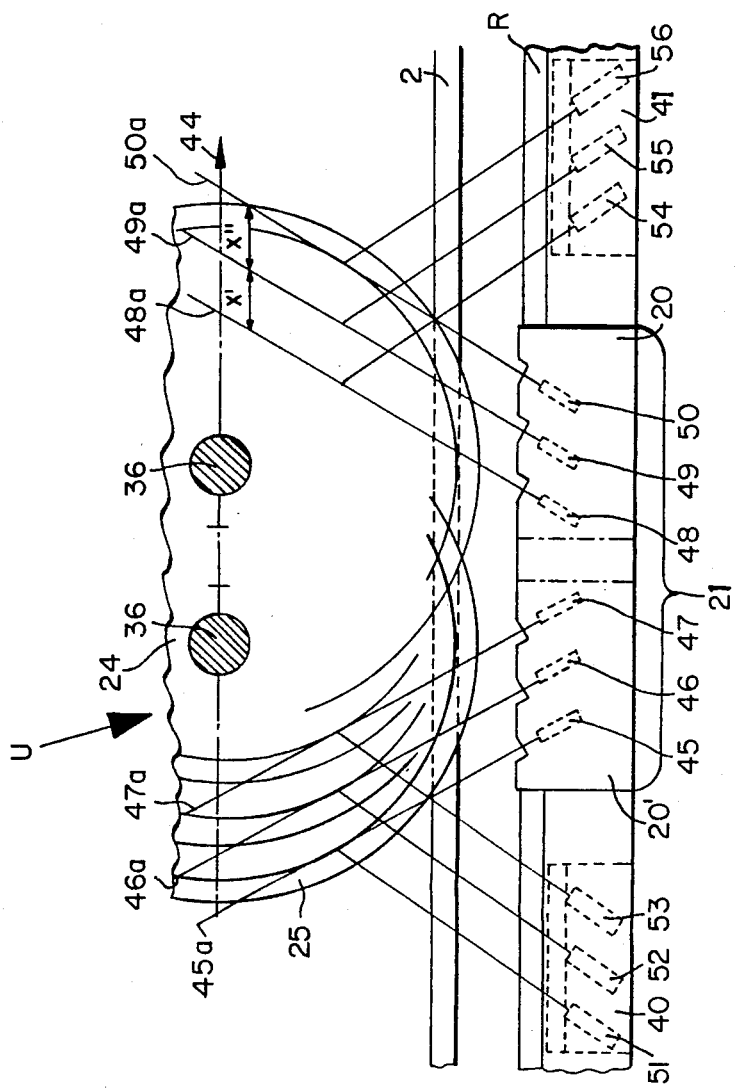
FIG. 7 is a view similar to that of FIG. 6, however, illustrating a modified, extended scanning system according to the invention.
Figure 8:
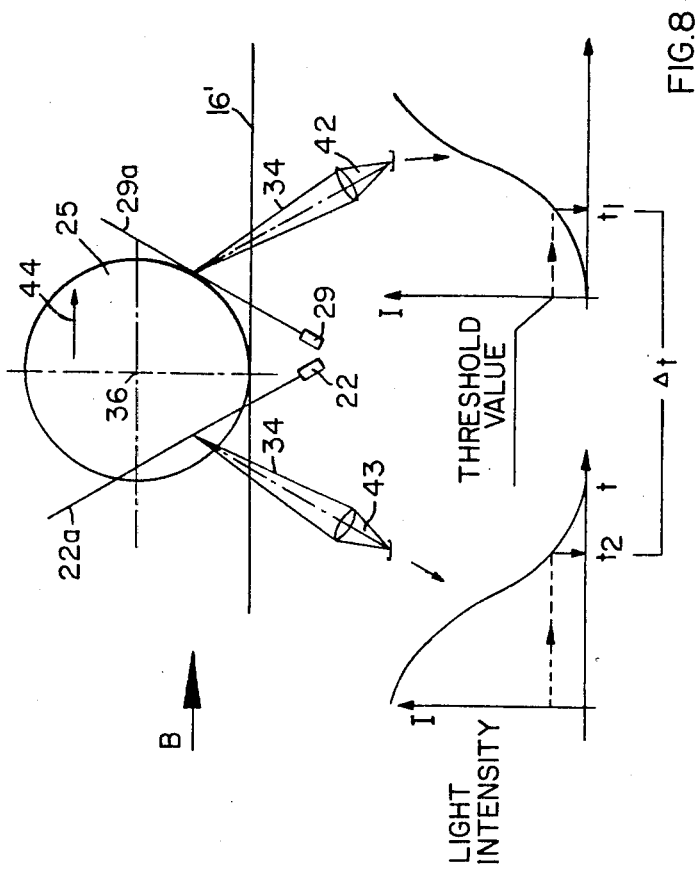
FIG. 8 illustrates schematically the time measuring system according to the invention.

FIG. 7 illustrates a measuring station which in principle is similar to that of FIG. 6. However, in FIG. 7 the measuring accuracy is improved by a simple ascertaining of an acceleration component of the wheel 25. For this purpose several laser beam generators 45, 46, and 47 form one set of lasers beam while laser generators 48, 49, and 50 form a second set of lasers. The laser beams of each set extend in parallel to each other. Additionally, the laser beams of one set diverge relative to the laser beams of the other set. The set 20′ of laser generators 45, 46, and 47 cooperate with a set 40 of laser optical receivers 51, 52 and 53. The set 20 of laser beam generators 48, 49, and 50 cooperates with laser optical receivers 54, 55, and 56 forming a set 41. All laser generators in the sets 20 and 20′ may be included in one housing 21 that may be exchangeable as a unit. Similarly, the optical receiver sets 40 and 41 are exchangeable as units. All units are carried by a frame member R, extending in parallel to the rail 2, whereby the housing 21 of the laser beam generators is secured to one side of the frame member R and the laser optical receiver sets 40 and 41 are secured to the opposite side of the frame member R. The lasers 45 and 50 may be tiltable individually about an adjustment axis for adjusting the direction of the laser beams individually as has been mentioned above with regard to FIG. 1 where the adjustment is about the axis 30. The laser optical receivers 51 to 56 may also be individually adjustable about respective axes, unless several receivers are used for receiving diffuse light from differently adjusted positions of the same laser beam.

In FIG. 7 the wheel set 24 with its axle 36 carrying wheels 25 travels from left to right in the direction of the arrow 44. As the wheel 25 first passes through the beams 45a, 46a, and 47a the respective receivers 51, 52, and 53 do not receive any diffuse light. However, as the wheel continues to travel to the right, it will sequentially become tangent to the laser beams 48a, 49a and 50a. Each of these laser beams 48a, 49a, and 50a will thus be diffused to cause a signal to be received in the receivers 54, 55, and 56 respectively, thereby producing respective time marker signals.

The horizontal distance x′ between the parallel laser beams 48a and 49a is known. The horizontal distance x between the parallel laser beams 49a and 50a is also known. Therefore, with the time durations measured with the aid of the just mentioned time markers, it is possible to determine the speed of the wheel travelling through these distances x′ and x. If there is a difference between these speeds the acceleration or deceleration may also be calculated.

Shortly after the wheel 25 has passed through the laser beam 48a, the respective spot on its circumferential surface on the back side of the wheel becomes tangent to the beam 45a in the measuring plane 17. Accordingly, the receiver 51 receives the respective diffused laser light and provides a time marker. The time difference between the time marker set by the receiver 54 and the time marker set by the receiver 51 permits calculating the diameter dependent distance l′ based on the known or ascertained speed of the wheel or of the acceleration of the wheel as described above with reference to FIG. 6. This operation is repeated with reference to the beams 46a and 47a which cause the receivers 52 and 53 to set respective time markers for ascertaining the speed and the acceleration of the wheel 25. Besides, the horizontal spacings between the laser beams $45a_1$ and $46a_1$, and $46a_1$ and $47a_1$ are known so that the speed and acceleration may be checked. Due to this double checking, so to speak, it is possible to also avoid erroneous measurements which could result, for example, from flat areas on the circumferential surface of a worn out or partially worn wheel.

A time measurement may be performed with the measuring station shown in FIG. 8. The lasers 22 and 29 are so located and adjusted in their position that the laser beams 22a and 29a diverge. Each of the laser optical receiver means 42 and 43 receives at its proper time a diffuse, reflected laser light 34. Each receiver 42 and 43 is so adjusted in its sensitivity that a certain threshold value of the reflected diffuse light must be exceeded for setting a time marker. As in FIG. 6, the receiver 42 sets a first time marker t1 and the receiver 43 sets a second time marker t2. The time difference $\Delta t$ between t1 and t2 represents the time needed by the wheel to pass through the diameter dependent distance l′. Generally, the laser beam generators should be equipped with such laser optical means that the respective laser beam, for example 22a or 29a, is focused onto the wheel circumferential surface, whereby the measuring accuracy and the repeatability of the measurements is improved.

In order to minimize interfering influences at the receivers, especially at the receiver optical means, the laser beam generators should be emitting, either at a high pulse frequency or the laser beams should be modulated, whereby the modulating frequency will depend on the travelling speed of the respective wheel.

It is also desirable and useful to monitor the light output of each laser beam generator to assure uniform measuring results. The degree of contamination on the surface of the optical means should also be monitored for the same purpose, for example, by measuring the diffusion degree of the remitted or retransmitted or reflected laser light.

Since measuring stations of this type must operate under rather rough operating conditions, for example in a railroad repair yard, it is desirable to house the transmitter unit or units in a dust- and water-tight casing. The output window or windows in such a casing should be provided with protective caps or flaps that can be opened or closed as needed. Additionally, or instead, a continuous airstream could be used to prevent contaminations of such light output windows.

The receiver optical means for receiving the reflected or remitted or retransmitted light can be arranged in the space to the right of the measuring plane 17 as shown in FIG. 5, preferably in a position where there is the least likelihood of damage and where there is a maximum reception of the diffused laser light. Each receiver should be provided with a protective window which is protected by an air curtain against moisture and condensation. Even automatic window wipers and/or heating systems could be used for protecting the input windows of the receivers. The optical receivers comprise photosensitive detectors which convert the incoming light into an electric signal which has been described above with reference to FIG. 9. A suitable light filter may be used for improving the signal definition.

Figure 10:
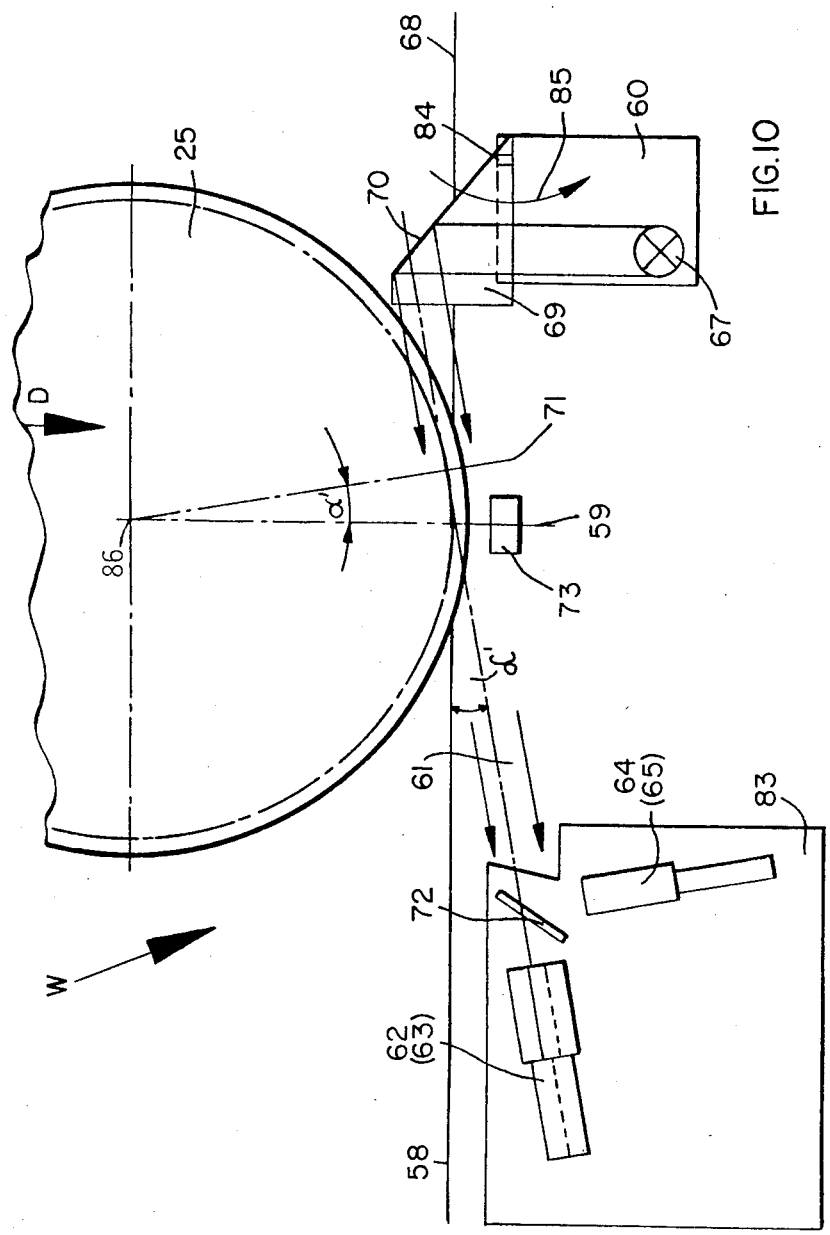
FIG. 10 is a side view of a profile or tread scanning device according to the invention.
Figure 11:
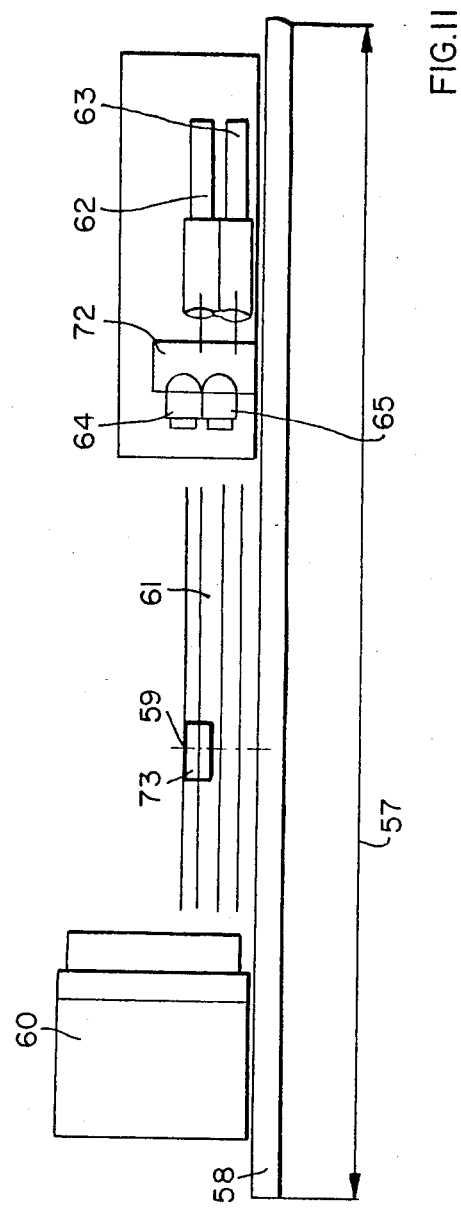
FIG. 11 is a view in the direction of the arrow D in FIG. 10.

FIG. 10 shows a schematic illustration of a device for sensing the quality of the wheel tread or profile. FIG. 11 shows a top view in the direction of the arrow D in FIG. 10. Therefore, FIGS. 10 and 11 will be described together. An auxiliary rail 58 defines a measuring distance 57 through which the wheel 25 must roll. The wheel 25 may be part of any wheel set that is of a rolling wheel set or a driven wheel set. For ascertaining the tread or profile surface, the respective rail vehicle travels slowly through the measured distance 57.

A support member such as a carrier plate 83 is mounted below the rolling plane 68 formed by the auxiliary rail 58. The plate 83 carries four cameras 62 to 65. These cameras are charge coupled devices and form two groups. One group comprises the cameras 62 and 63. The other group comprises the cameras 64 and 65. The cameras 62 to 65 are located to the left of a measuring position plane 59 extending perpendicularly to the rolling plane 58 and perpendicularly to the plane of the drawing of FIG. 10. Light generator means 60 are located on the right-hand side of the measuring position plane 59. The light source means 60 comprise a light generator 67 and an output member 69 including a deflection mirror 70 for directing the light beam 61 onto a beam splitter 72 which passes some of the light to the cameras 62, 63 and which deflects some of the light to the cameras 64 and 65. The light beam 61 is a plane parallel beam. The deflector mirror 70 is so arranged, that the plane parallel light beam 61 extends tangentially to the surface of the wheel tread. For this purpose the deflector mirror 70 with the output end 69 of the light source 60 extends partially above the plane 68. Thus, it is necessary that the wheel 25 can roll over the output end 69 with its deflector mirror 70. For this purpose, the output end 69 forming a hood, for example, is hinged by a journal 84 to the housing of the light source 60 for tilting in the direction of the arrow 85, preferably against the force of a spring, not shown, which tends to hold the hood in the position shown in FIG. 10 so that once the wheel has passed over the hood, it will return into the shown position.

In order to avoid tilting the cameras, it is preferable to install these cameras in a fixed position below the plane 58 as mentioned. Therefore, it is necessary that the plane parallel light beam 61 extends at an angle relative to the rolling plane 58 to reach the cameras 62 to 65. As a result, the measuring plane 71 passing through the center 86 of the wheel 25 and extending perpendicularly to the light beam 61, also includes an angle $\alpha'$ with the vertical measuring position plane 59. The angle $\alpha'$ is an acute angle. The precision with which the measuring plane 71 will actually pass through the center 86 at the time of measurement, will be within the tolerances permissible or achieveable for the optical devices such as the mirrors 70 and 72. The mirror and beam-splitter 72 is mounted on the support plate 83. Thus, the arrangement and orientation of the cameras 64 and 65 will depend on the location of the mirror 72. A switch 73 to be operated by the wheel, will activated the device, whereby the switch is so located in the measuring position plane 59 that activation takes place when the wheel 25 is in the correct measuring position. The measurement to be performed will be described below.

Figure 12:
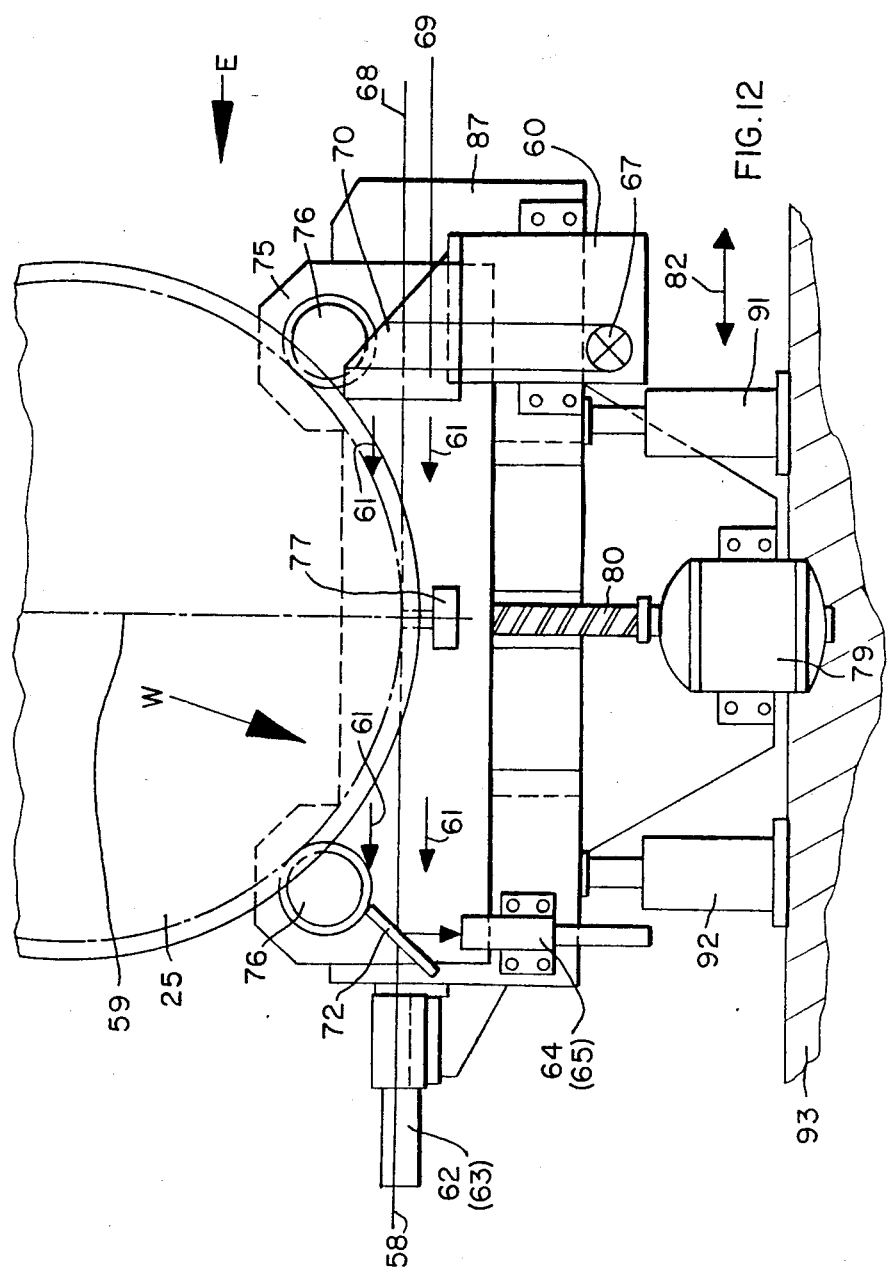
FIG. 12 illustrates a modified embodiment of a profile or tread sensing device according to the invention, in a view similar to that of FIG. 10.
Figure 13:
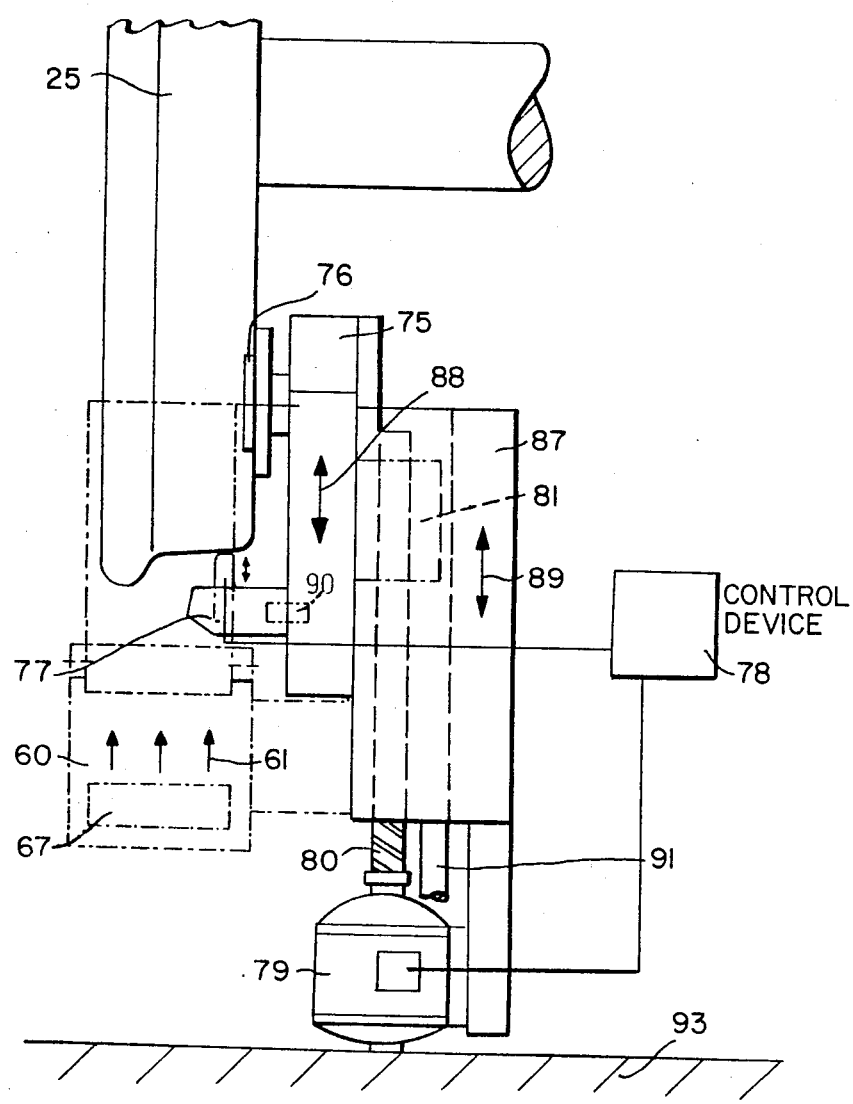
FIG. 13 is a view in the direction of the arrow E in FIG. 12.

FIGS. 12 and 13 show a modification of the measuring device shown in FIGS. 10 and 11. A wheel 25 rolls on the auxiliary rail 58 forming the rolling plane 68, into the measuring distance. Each wheel of a wheel set is received in a cradle formed by a pair of support rollers 76. A vertical measuring position plane 59 extends perpendicularly to the measuring plane 68 and centrally between the support rollers 76. The support rollers 76 are movable at least vertically for lifting the wheel off the rolling or measuring plane 68 by a defined lift for performing the measurement to be described below. The support rollers 76 support the wheel 25 so that the latter is able to rotate. However, if a measurement is to be made only at one point on the circumferential surface of the wheel, it would be sufficient to replace the support rollers 76 by a rigid, nonrotatable support member.

Bearing brackets 75 carry the support rollers 76 and these brackets form the above mentioned cradle or slide which is vertically movable in a machine bed 87. A motor 79 driving a spindle 80 is rigidly supported by the machine bed 87. The motor 79, which may be a stepping motor, drives a spindle 80, connected to the cradle for shifting the cradle vertically up and down by measured lifting steps. The spindle 80 engages a threaded spindle nut 81 rigidly secured to the cradle formed by the brackets 75. Depending on the direction of rotation of the motor 79, the cradle can be moved up or down as indicated by the arrow 88. The bearing brackets 75 carry a sensor member 77 located in the center position measuring plane 59 for ascertaining how deep the wheel 25 reaches downwardly with its circumferential tread surface between the support rollers 76. This downward reach of the wheel 25 below a horizontal line defined by the rotational axis of the support rollers 76, for example, depends on the wheel diameter. Based on this downward reach of the wheel, it is possible to properly align the plane parallel light beams 61. The sensor 77 is tiltable about an axis 90 so that it may be tilted out of the way after it has ascertained the downward reach of the wheel 25. Preferably, the sensor 77 is tilted out of the way by automatic means not shown.

If desired, the plane parallel light beam 61 may be properly aligned without the aid of the sensor 77 by using the light beam itself for the proper alignment. For this purpose the diameter of the light beam 61 is measured on the camera side 64, 65. The size of the light beam diameter is a measure for the downward reach of the wheel. Thus, the light source producing the light beam 61 and the camera may be adjusted in their position relative to the diameter of the light beam. If no light appears on the camera side, it is necessary to either lift the wheel, or lower at least the illuminating means or light generating means 60. This adjustment needs to be done until a certain required light beam diameter is measured on the camera side. On the other hand, when initially the light beam diameter is too large, thereby preventing obtaining a complete shadow image, the adjustment is in the opposite direction. In other words, the wheel must be lowered or at least the light generating means 60 must be raised. In this connection it is not necessary that the light generating means and the cameras are moved in unison linearly in a vertical direction. Rather, it is conceivable that the light source or generating 60 and the cameras are tilted so that their alignment relative to each other is maintained while the plane parallel light beam 61 is either raised or lowered relative to the measuring position plane 59.

The machine bed 87 carrying the bearing bracket 75 is supported by hydraulic piston cylinder devices 91 and 92 for raising and lowering the bed 87 in the direction of the arrow 89. One end of the piston cylinder devices 91 and 92 is rigidly secured to the foundation if the apparatus is stationary. However, the so-called foundation 93 may also be a movable carriage capable of travelling along the rail or auxiliary rail 58.

The above described light source or light generating means 60 are mounted to the bed 87 on one side of the measuring position plane 59. The cameras 62 and 63, as well as 64 and 65 are secured to the bed 87 opposite the means 60. The deflecting mirror 72 is also mounted to the bed 87. The light generating means 60, 67 are shown by dash-dotted lines in FIG. 13.

If desired, the hydraulic piston cylinder devices 91 and 92 may be pivoted to the machine bed 87 so that only one of these devices might require adjustment for a tilting adjustment movement of the bed 87. In that case, it is necessary to provide for a length compensation in the spacing between the piston rods relative to each other as is conventional.

Assuming a wheel 25 is supposed to roll from left to right in the measuring station. For this purpose the left-hand support roller 76 would be lowered and the right-hand support roller 76 would be in the position shown in FIG. 12. Thus, the wheel would be stopped against the right-hand roller 76. If the measuring station is movable, it could travel along with the incoming wheel as the wheel bears against the roller 76 and the station is supported on a carriage instead of the foundation 93. When the wheel comes to a stop, the left-hand roller 76 is raised by operating the hydraulic cylinder device 92 until the left-hand roller 76 also bears against the wheel 25. Now both hydraulic piston cylinder devices 91 and 92 are lifted in unison so that the wheel is lifted off the auxiliary or measuring rail 58 to the required lifted position. If the sensor 77 measures a downward reach of the wheel which is too large, the sensor 77 will provide a respective signal to the control system 78 which in turn activates the motor 79 for rotating the spindle 80, thereby lifting the bearing brackets 75 upwardly for respectively lifting the wheel to reduce the downward penetration by the wheel into the light beam. The bed 87 remains stationary during this particular lift of the bearing brackets 75. As soon as the wheel has reached the desired position, depending on the value measured by the sensor 77, the control device 78 stops the motor 79. Since the light generating means 60, the cameras 62 to 65, and the semi-permeable deflecting mirror 72 are carried by the bed 87, which retains its position, the wheel 25 changes its relative position to these components of the system so that it now becomes possible to measure the penetration depth of the wheel 25, or rather, of its circumferential surface into the plane parallel light beam 61. When the measurements are completed, the hydraulic cylinders 91 and 92 are lowered again and the wheel 25 again contacts the auxiliary rail or track 58 so that it may continue to roll on that track. As mentioned, it is possible to move the measuring station if the measuring station is mounted on a carriage movable in the direction back and forth indicated by the arrow 82. In that instance it would not be necessary, for instance to stop a train for checking the train wheels.

The measuring itself takes place in the same manner in the embodiment of FIGS. 10 and 11 and in the embodiment of FIGS. 12 and 13. The light generating means or source 60, 67 preferably comprises a continuous light source and a flashlight source. The continuous light source facilitates the adjustment and maintenance work. High frequency fluorescent lights are preferably used for producing the continuous light while the flashlight is peferably produced by torch type flashlights. In any event, the flashlight is preferably installed redundantly so that if one flashlight fails, an automatic switch over can bring the other flashlight into action so that the measuring station remains operational until the next routine repair.

The light is diffused, for example, with the aid of a ground glass plate and reflected as plane parallel light from a mirror 70 to the light sensitive cameras, whereby a plane parallel light beam 61 contacts the circumferential surface of the wheel 25 in a tangential plane. The above mentioned rail switch 73 may trigger the flashlight, whereby the flashlight becomes available at the proper point of time.

The flashlight produces a shadow profile image of the wheel circumferential surface, or rather of its contour and this image is received by the four semiconductor cameras. To save space, the cameras are arranged at an angle relative to each other and the beam splitting mirror 72 makes sure that all cameras receive light. Each camera may be equipped with a zoom objective having a maximal focal length of about 110 mm. A blue filter is provided to pass the blue light from the flashlight and to screen out the infrared component of the flashlight. In any event, the focal length must be such that each receiver surface or screen of each camera is completely filled. All cameras 62 to 65 are driven in synchronism by a clock source assuring the required synchronism with the image point.

Figure 18:
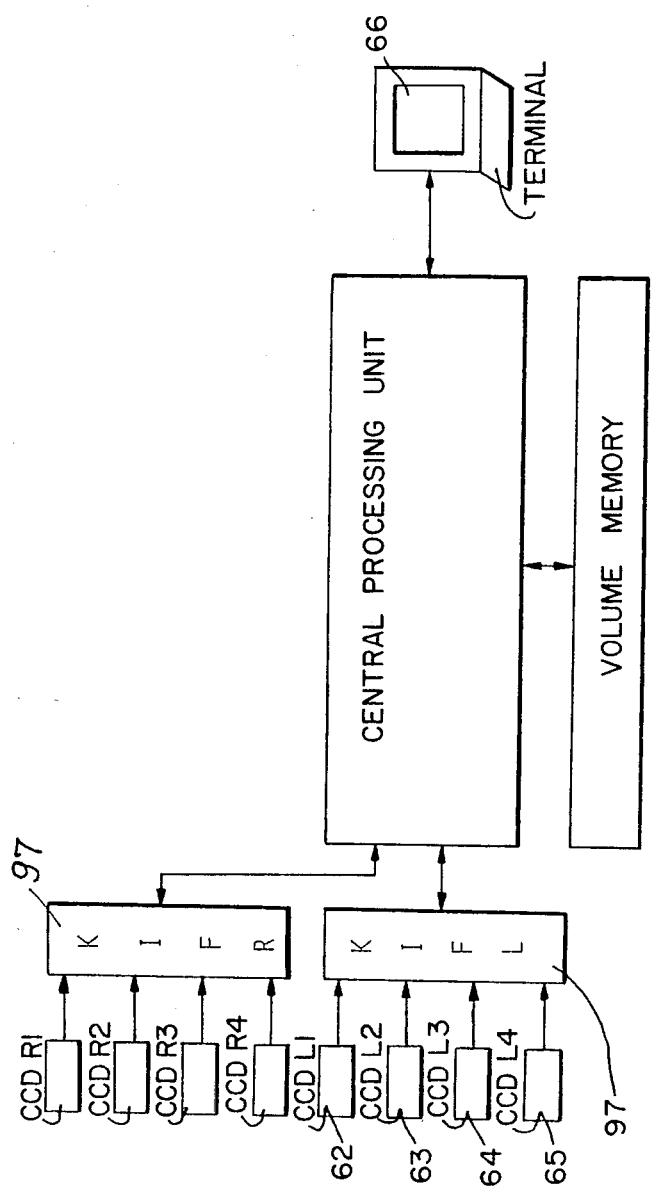
FIG. 18 is a schematic illustration of a computer system with cameras for both wheels of a wheel set, including an interface between the camera and the central computer as well as memory means a data output terminal.
Figure 19:
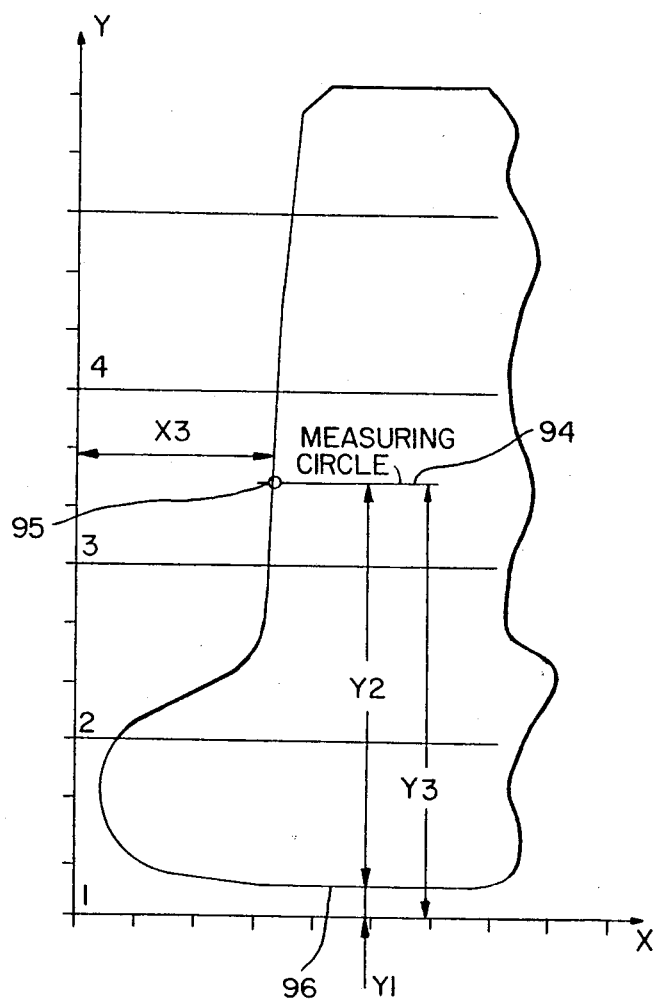
FIG. 19 illustrates the graphic data evaluation or processing by the central computer.

All signals of the several cameras are to be processed by a single computer. Therefore, a separate preliminary signal processing is necessary for each camera. This preliminary signal processing has the advantage that the central computer unit may be relatively simple. Besides, this feature has the advantage that substantially any desired number of cameras may be employed. The preliminary signal process involves separating the synchronous component from the video signals and to form from the gray image a binary image with the aid of a self-controlled threshold circuit. The black and white transition of the profile contour of the wheel is detected and stored as a coordinate value in the binary image for each line of the binary image. The time needed for this procedure is maximally 40 msec. This preliminary signal processing takes place in parallel for each camera and in synchronism for all cameras. As a result, the complete profile line or contour is available as a set of data after each image scanning. These data can now be read into the central computer unit which produces from these coordinate values, a profile line for display in an internal coordinate system of the computer as shown in FIG. 19. The profile line can be defined or determined without any ambiguity by the computer within its own internal computer coordinate system with the aid of the definition of the so-called measuring circle 94 providing a point 95 on the profile line or contour. The position of the point 95 in the y-direction away from the facing side 96 of the profile is a fixed point by definition. This fixed point is spaced from the facing side by the spacing Y2. The computer is able, with the aid of the coordinate stored in the computer memory, to determine at which spacing Y1 the profile line 96 extends. Thus, the computer can fix the position of the measuring circle 94 with the spacing Y2 from the facing side 96. The measuring circle 94 is now located at the spacing Y3 from the abscissa as shown in FIG. 19. The spacing X3 from the ordinate is also known so that the circle 94, or rather, the point 95, is unambiguously determined by the computer in the coordinate system. The computer now proceeds to locate a desired, or rated profile in its internal coordinate system in such a way that the circle 94 of the rated profile and the same circle of the actually measured profile coincide with each other. Thereafter it is possible without problems to locate the deviations of the coordinates of the individual points on the actually measured wheel profile from the rated profile, and to display these deviations as a measured profile or contour line on a display screen 66 as shown in FIG. 18. Rather than using a display screen, the actual measured profile or contour line could be printed out by a plotter. Further, these actually measured profile values can be used for controlling a machine tool for truing the wheel set. The position of all cameras relative to one another and the position of all images in each camera are known relative to each other. Therefore, it is possible to evaluate this information to obtain the lateral spacing of the wheel profiles from each other and thus the spacing of the wheels of a wheel set from each other.

FIG. 18 illustrates in a block diagram the signal processing system. The camereas 62 to 65 also visible in FIG. 10 are shown in FIG. 18 as the "left-side" cameras which are, for example, charge coupled devices CCDL1, CCDL2, CCDL3, and CCDL4. A further set of cameras which are also charge coupled devices CCDR1, CCDR2, CCDR3, and CCDR4, are referred to as the "right-side" set of cameras which are not visible in FIG. 10. The left side cameras are interconnected by a respective left (KIFL) interface circuit 97. The right side cameras are interconnected by a respective right (KIFR) interface circuit 97. The camera interface circuits 97 connect the cameras to the central processing or computer unit which has a volume memory. The computer unit in turn is also connected to the above mentioned display terminal 66.

Figure 16:
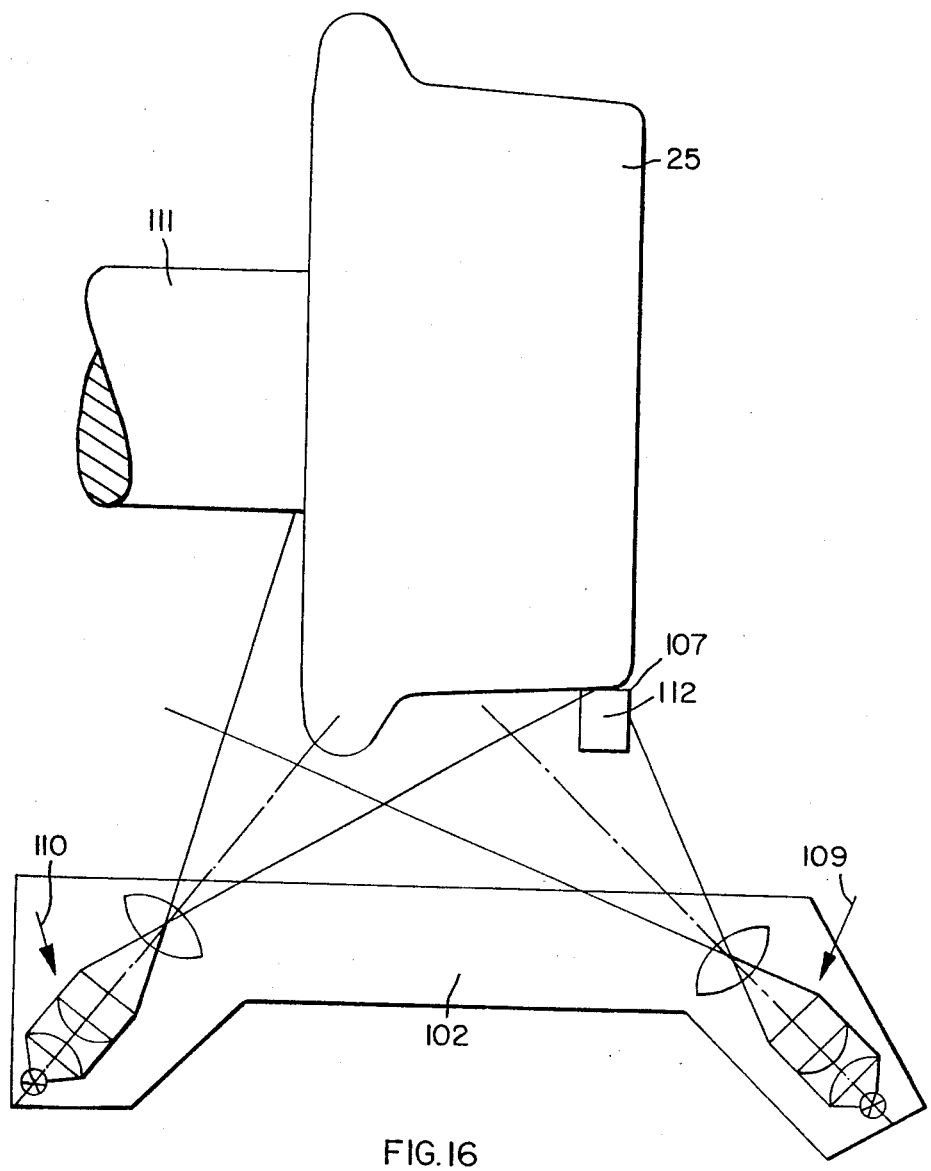
FIG. 16 is a view in the direction of the arrow F in FIG. 14.

FIGS. 14 and 16 show a further modification of a profile sensing or scanning device, whereby FIG. 6 is a view in the direction of the arrow F in FIG. 14. However, FIG. 16 does not show the cameras 103, 104, 105, and 106. A measured distance 99 also referred to as the measuring range is defined along an auxiliary rail 112 over which a wheel 25, to be measured, will roll along a rolling surface or plane 107. The vehicle to which the wheel 25 is secured will slowly roll through the measured distance 99. A carrier 124' is located below the measuring or rolling plane 107. The carrier 124' may be a plate on which the four charge coupled devices forming the cameras 103 to 106 are mounted in two groups. Just as in FIG. 10, one camera group comprises the cameras 103 and 104. The other group comprises the cameras 105 and 106. The measuring circle or point 100 is located on the rolling plane 107 in the vertical plane 116. A similar set of cameras may be arranged mirror-symmetrically on the right side of the vertical plane 116. A mounting member 102 is arranged vertically below the auxiliary rail 112 for supporting light sources 109 and 110. These light sources are laterally displaced relative to the plane defined by the wheel, but in alignment with the vertical plane 116 and with the axis 111 of the wheel set. These light sources 109 and 110 are optically constructed in such a way that the light beams in the plane 116 will produce on the profile of the wheel 25 a light section or a light edge. Producing a light section or a light edge is well known in the art and hence does not require more elaboration. By using two light sources 109 and 110 as shown in FIG. 16, it is assured that shadow effects, for example caused by the wheel flange or by the auxiliary rail 112, are prevented.

By arranging the cameras 103 to 106 below the movement or rolling plane 107, it is prevented that the cameras interfere with the passage of the wheel through the measured distance 99. The cameras are arranged so that they receive the light directed in the direction 123 which forms with the plane 116, or rather with the light beam an angle $\alpha$ which is less than 90°, but not smaller than 60°, thus, $60° < \alpha < 90°$.

Figure 14A:
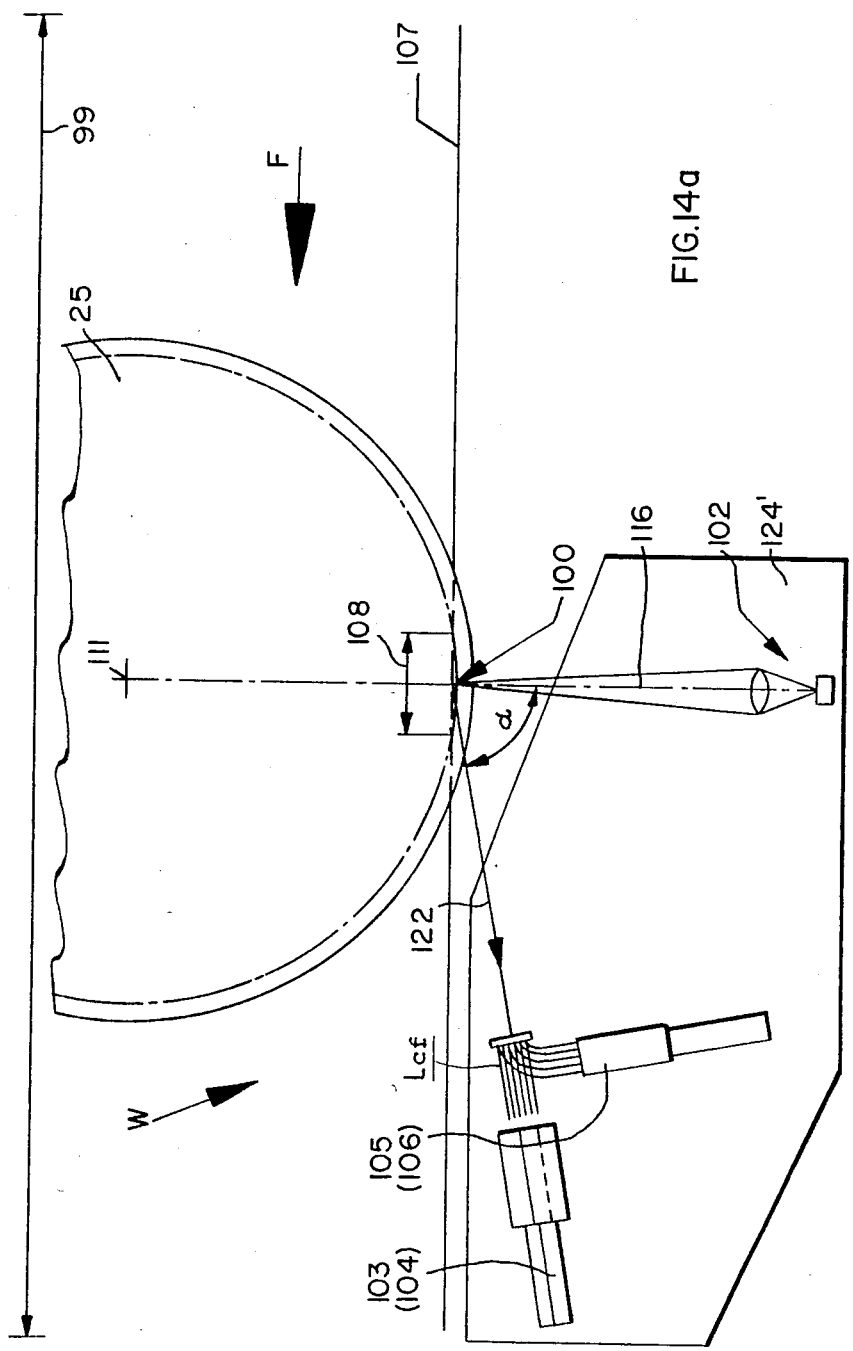

This type of arrangement causes a distortion in the profile or contour being scanned. However, such distortion can be corrected by the central computing or processing unit. By using two additional cameras 105 and 106 which receive their light through a beam splitter and reflector 117, to save space, it is possible to achieve an increased resolution. Rather than using a beam splitter and reflector 117, it is possible to use light conductor fibers Lef as shown in FIG. 14a.

It is important that the profile scanning takes place as precisely as possible within the measuring point or circle 100 so that the cameras 103 to 106 provide correct data to the signal processing circuits. Thus, it is necessary to sense the position or circle or point 100 and to then trigger the camera and light source when the position 100 has been sensed. As mentioned above, it is possible to use a so-called rail switch activated by a wheel for this purpose. Conventional switches are available for this purpose which have a sufficiently small switching point tolerance. Such switches do not need to be mechanical or electrical mechanical switches, optical switches are suitable as well. When the wheel 25 reaches the measuring position 100 in the measured distance 99, the just mentioned switching device, such as a rail switch, triggers an illuminating flashlight in the light source 102 and simultaneously the cameras 103 to 106 are activated. Thus, the cameras take a profile or contour image of the wheel and this image is then supplied in the form of respective data to the further data processing devices as shown in FIG. 18.

The wheel scanning device of FIG. 15 provides an enlarged measuring circle or zone 101 which is achieved by a slight modification in the arrangement of the lighting device 102 and the cameras 103, to 106. The device of FIG. 15 for scanning the profile of a wheel 25 also avoids the distorted imaging of the profile in the cameras 103 to 106. This feature has the advantage that corresponding circuits in the data processing or central processing unit for equalizing or rectifying the distortions are not necessary. The lighting device 102 and the cameras 103 to 106 are arranged so that the plane 116 in which the light beam extends, and the deflection direction 123 enclose an angle $\beta$ of less than 90°. To make sure that the cameras remain below the rolling plane 107, the light beam in the plane 116 needs to extend radially relative to the wheel 25 and at an acute angle relative to the plane 107. The wheel travels in the direction 14 through the measured distance 99.

In order to satisfy the above mentioned condition in FIG. 15 that the light beam in the plane 116 extends radially relative to the circumferential surface of the wheel 25, it is necessary that the angular position of the plane 116 in which the light beam extends is adjustable in response to the wheel diameter. The position of the cameras 103 to 106 needs to be changed accordingly and simultaneously. Such adjustment is achieved in that the carrier 124 carries an adjustable mounting bracket 115 for the cameras and for the light source 102. The mounting bracket 115 is journalled at 126 for a tilting movement in the direction of the arrow 125 in response to the operation of the motor 127 which is controlled by a control device 128. The input to the control device 128 is the measurement of the wheel diameter and the control device 128 adjusts the position of the mounting bracket 115 accordingly by a tilting movement as indicated by the arrow 125. The diameter is measured as described above in the measuring range X.

Another possibility for increasing the measuring zone or circle 100 in FIG. 14 involves performing a rapid multiple measurement in a measuring zone 108 of suitable size as shown in FIG. 14. Such multiple measurements are used by the computer to provide a profile contour which first rises and thereafter declines again if the cameras are arranged on one side only of the plane 116 as shown in FIG. 14. The speed of the sequential image taking is known and so is the fact that the wheel to be measured has a circular contour. Further, the circular contour moves through the measured distance 99 either by rolling or by being pushed through this measured distance 99. Therefore, the rise to be expected in the initially distorted profile contour is also known. As a result, it can be ascertained whether an image has been take of the exact peak spot on a wheel or whether the image taking took place just directly prior and directly after the peak spot. If it is clear that one image hit the peak point, the result can be directly evaluated. On the other hand, where it appears that images were taken just ahead and just behind the peak point, the computer must perform a correction.

A computer correction need not be made if in FIG. 14 a second camera set is provided mirror-symmetrically to the first camera set 103 to 106 on the right side of the central vertical plane 116. By taking repeated exposures in rapid sequence in the measuring zone 108, the central computer will receive two sets of signals representing two different profile contours and taken in opposite directions. If two images are taken exactly in the measuring position 100 by all cameras, the computer will display a single contour because the two contours match each other since in that instance they are identical to each other. These matching contours represent the contour to be measured. However, if such a coincidence of two contours is not achieved, an interpolation may be made between two contours most closely spaced from each other. The central processing unit would then require the necessary interpolation circuits. However, when such interpolation is made, it is no longer necessary to make a correction with regard to the contour displacement to be expected as a function of the wheel diameter and as a function of the time spacing between adjacent exposures of an image sequence.

In order to achieve a sufficiently rapid image taking sequence, it is possible to use several sets of cameras and to operate these cameras in sequence. Yet another possibility is to perform a rapid sequence of multiple exposures where a light section providing light source is used in connection with one set of cameras. This rapid sequence of multiple exposures would have to be made prior to reading the data from the cameras into the computer.

Figure 17:
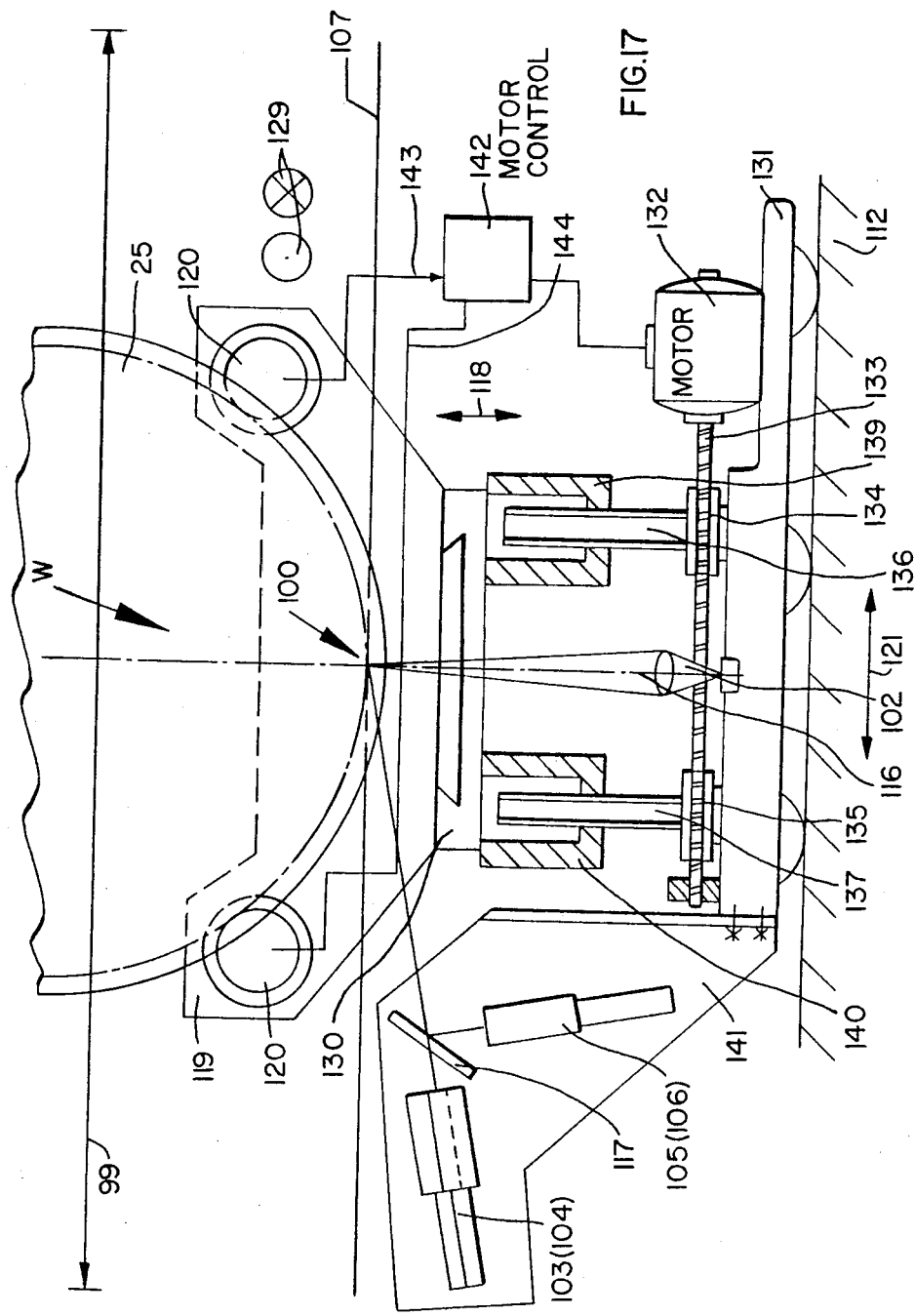
FIG. 17 shows a modification of FIG. 1, wherein the apparatus is self centering.

FIG. 17 shows another embodiment for illuminating the measuring position 100 as precisely as possible at the instant of scanning. Here again, a measured distance 99 is provided along the rolling surface 107 for the wheel 25. A support roller carrier 119 carring support rollers 120 is located laterally relative to the rail or rolling plane 107. The carrier 119 with its rollers 120 is mounted on a slide 130 which is displaceable horizontally back and forth in a direction in parallel to the axle of the wheel 25 and thus perpendicularly to the plane of the drawing as indicated by the symbols 129 in FIG. 17. The slide 130 in turn is mounted on a carriage 131 movable horizontally back and forth in the direction of the arrow 121 on an auxiliary rail 112. The carriage 131 supports a motor 132 driving a spindle 133. The spindle 133 drives two worm gears 134 and 135 which in turn drive spindles 136 and 137 for lifting the roller support 119. The spindles 136, 137 cooperate with spindle nuts 139, 140 connected to the slide 130 for raising and lowering the slide as indicated by the arrow 118. Thus, the support roller carrier 119 with its rollers 120 is movable in all six directions of space.

The light source 102 in FIG. 17 is supported on the carriage 131 in such a position that it can illuminate the circumferential surface of the wheel 25 either directly or through deflection means. A carrier 141 is secured to the carriage 131 and the cameras 103, 104, 105, and 106 are mounted on the carrier 141. The beam splitting and deflecting mirror 117 is also mounted on the carrier 141.

The apparatus of FIG. 17 is operated as follows. First, the support roller bracket 119 on its slide 130 is moved against the wheel perpendicularly to the plane of the drawing back and forth as indicated at 129 until the support rollers 120 come into the range of the circumferential tread surface of the wheel 25 or into the range of the lateral wheel flange. Thereafter, the motor 132 is activated to raise the carrier 119 until the rollers 120 contact the circumferential surface of the wheel. The control unit 142 senses the contact between the wheel 25 and the rollers 120. For this purpose the strain gage sensors are provided which measure the contact force between the wheel and the rollers 120 to produce a respective signal which is transmitted through conductors 143, 144 to the control unit 142 which stops the motor 132 in response to these impulses coming from the strain gages. The wheel can move through the measured distance 99, thereby entraining the carriage 131 and the entire measuring device W. Thus, measuring or scanning of the wheel profile or contour takes place while a train, for example, is moving through the measuring system. When the measurement is completed, the support roller carrier 119 is lowered again, bringing the support rollers 120 out of contact with the wheel. Thereafter, the carriage 31 may be brought back into a starting position for cooperation with the next wheel. Several measuring devices W/U may be provided within the measured distance 99.

When the wheel 25 is in a measuring or scanning position 100 or 101, the light generating device 102 is switched on to produce a light section or a light edge on the circumference of the wheel 25 to produce a profile or contour image as described above. To save space on the support 141, the cameras are arranged at an angle and the beam splitter deflecting mirror 117 is used. All cameras are operated in synchronism from a common power source to assure the synchronism with the image point. Each camera may be equipped with a zoom objective and with a filter passing the blue light components and suppressing the infrared light components of the flashlight. The focal length of each objective must be such that the surface that is being scanned completely fills the receiver surface of the respective camerea. Here again, the signals from several cameras may be processed by a single central processing unit or computer, thus requiring an individual preliminary signal processing for each camera as described above with reference to FIGS. 18 and 19.

By arranging a cleaning system V, V' upstream of the respective profile or tread sensing device W or upstream of the diameter sensing device U, as viewed in the motion direction, for cleaning at least the circumferential or tread surface of the wheel, it is assured that the sensing or measuring is not disturbed by any dirt that may be adhering to the wheel surface. A steam cleaner or compressed air cleaner of conventional contruction is suitable for this purpose. Preferably, the cleaning apparatus, or at least its cleaning component, moves along with the wheel in the measuring range to assure the intended performance without stopping a train, for example. Even a movable cleaning system is relatively simple in its construction and the movement of the cleaning apparatus simplifies the cleaning operation.

Each measuring apparatus comprises a carrier for the diameter measuring device U and for the profile quality sensing device. The diameter measuring device includes on the carrier one source or generator for generating at least two electromagnetic beams 26', 26'', whereby the beams extend at least approximately in the diameter measuring plane 17 in which the diameter d is to be measured. The beams are so directed or spaced from each other that basic spacing c is provided between the two beams in the diameter measuring plane 6 or 17. The carrier may be a carriage for moving the beam generator in the diameter measuring plane relative to the wheel set and in a direction perpendicularly to the beam direction while maintaining the basic spacing c between the two beams. The beam receivers 27, 28 are arranged in the available free space and in such a position that they receive the retransmitted light reflected by the wheel surface. The receiver or receivers with their respective receiver optical devices sense the radiation 34 which is retransmitted when a beam hits the circumferential surface of a wheel in a tangential manner. The receivers provide electrical signals which are supplied to a time measuring device 33 and to a signal evaluating device 35. Preferably, the beams have a wave length in the range of 200 to 2000 nm. Preferably, the beam generator or generators comprise a laser or lasers and the carrier comprises a rail section which constitutes a rolling plane for the wheel or wheel set. It is to be understoon that the apparatus comprises the same components for each wheel of a wheel set, whereby these components are arranged in a mirror-symmetrical manner along both rails of a track. The arrangement is such that both wheels of a wheel set must roll through the diameter measuring plane 6, 17 in which the diameter is to be measured and in which plane the respective measuring beams are directed upwardly.

The transmitters and receivers must be switched on before a wheel passes through the measuring range or station. The apparatus can be switched on manually or by a wheel operated rail switch. When a wheel or wheel set passes into the first beam and is contacted tangentially by the first beam, the wheel produces reflected light at the measuring or contact point 38 shown in FIG. 5. The receiver optical means register this reflected light to produce a first time marker signal. As the wheel continues to roll through the measuring station it contacts tangentially the next beam. Again reflected light is received by the respective optical receiver means and the resulting signal sets a second time marker. The basic spacing c between the two beams 26' and 26'' is known and may, for example, be larger or smaller than a wheel diameter expectedly to be measured. Based on the time expiring between the two time markers and on the known basic distance c it is possible for the evaluating computer circuits to calculate the speed of the wheel.

When the spacing c is smaller than the wheel diameter, the second time marker starts a second time duration which is stopped again by a third time marker when the backside, so to speak, of the wheel circumferential surface is contacted by the first beam. This third time duration depends on the wheel diameter assuming a constant wheel speed. Thus, the wheel diameter can be easily calculated because it is the sum of the basic spacing c plus a value corresponding to the product of the last mentioned time duration multiplied by the wheel speed. It is clear that the optical receivers must be so constructed that they are capable of receiving the diffuse light that is produced as a result of a tangential contact between the emitted beam and the wheel surface. Thus, the receiver means including their optical receiver component, are tuned to the wave length of the light emitted by the light beam generator such as the laser 26. It is not important whether the wheel moves relative to the measuring apparatus or vice versa as long as there is the required relative movement.

By providing a carrier in the form of a rail section 2, 16, 58, 112 for each wheel of a wheel set, so that these rail sections form the rolling surface or plane 2', 16', 68, 107 and by using at least two electromagnetic beams 26', 26'' produced, for example, by a single laser 26, a compact structure is achieved, whereby the guiding of the laser beams is particularly simple and provides exact measuring results.

The optical means may be displaced relative to each other along the track by a distance which either corresponds to the basic distance c as shown in FIG. 9, or by a distance which is less than the basic spacing c, as shown, for example, in FIG. 6. The optical means may be arranged in a redundant manner, whereby multiple measurements may be performed for achieving a higher measuring accuracy and a better measuring repeatability to also measure acceleration components. Another advantage of arranging the optical receiver means in a redundant fashion is seen in the avoidance of erroneous measurements caused by flattened out portions in the circumferential wheel surface. In a redundant arrangement it is preferable to make the displacement between the optical components smaller than the basic distance c, whereby acceleration components are more accurately obtained with certainty.

As shown in FIG. 6 the beam generators 22, 29, 29' or, as shown in FIG. 7, the beam generators 45 to 50 have known spacings Sq and X' or X from each other. The beam generators are arranged at known spacings Hq from the rolling plane 16' formed by the rail 16 on which the wheel rolls. The beam generators including their respective optical receiver means 42, 43, 42' or 51 or 56, are divided into two groups by a plane P extending perpendicularly to the running plane 2' or 16' and in parallel to the wheel set axle 36, whereby the laser beams are so tilted that each beam of one group extends in a diverging manner relative to the beam of the other group. Preferably, the dividing plane P is a bisector of the angle enclosed by the diverging beams.

This type of arrangement has the advantage that the same measuring principle and an apparatus of substantially the same structure can be used to determine the diameter of a wheel even if the available portion of the wheel adjacent to the rolling surface 16' is merely a chord of less than 180°. The calculation required in such a measuring system is somewhat more involved than the system shown in FIG. 9. However, the system of FIG. 6 can be used where, for example, brake shoes leave less than 180° of the lower part of the wheel accessible to the measuring beams. Thus, even if only about 120° or less of the wheel circumferential surface is available for measurements, the diameter and quality of the wheel profile may still be ascertained. The mentioned additional calculation due to the fact that the diameter depending portion L' is no longer located on the wheel diameter line, does not pose any problem for available computer circuits. Besides, the calculation is substantially simplified where the plane P forms an angle bisector because the same numerical values occur on both sides of the mirror-symmetrical dividing plane. Another advantage is seen in that the adjustment and proper alignment of the apparatus is simplified where the dividing plane is a bisector. A simplification of the adjustment and alignment is also obtained where the beams of one group 45 to 47, 48 to 50, 29, and 29' extend in parallel to each other, please see for example, FIG. 6. Also the programming is simplified in such an arrangement.

By providing a laser 22 and a receiver 43 on the inlet side of the wheel and at least two lasers 29, 29' as well as two lasers 42, 42' on the outlet side, it is easily possible to ascertain the required measuring points, whereby the outlet group 29, 29', 42, 42' serves for ascertaining the wheel speed while the inlet group 22, 43 and the first part of the outlet group 29, 42 serve for measuring the time needed by the wheel to pass through a specific distance. Where the outlet group has two portions, as shown in FIG. 6, the acceleration or deceleration may also be measured.

By arranging the laser transmitter and receiver means in groups or even as modular units, it becomes possible to vary the measuring capacity of the system by exchanging one modulator set against another modular set, especially of the transmitter or laser beam generator modules. Modules are shown at 40, 21, and 41 in FIG. 7.

By making the laser generators adjustable relative to a tilting axis 30 it becomes easy to adjust the divergence of the transmitted and received light beams and to also assure that the transmitted beams of a group extend in parallel to each other and the received beams of a group extend in parallel to each other, as shown in the right-hand part of FIG. 6, for example. This feature makes it possible to make good use of any available space below the running surface 16' of the respective auxiliary carrier rail. Additionally, the same apparatus can be used in spaces having different sizes below the rail by bringing the respective receivers and transmitters closer together.

By using the beam splitters and deflectors 31, 32 as shown in FIG. 9, a certain economy is achieved because the apparatus can measure the wheel diameter although only one laser beam generator 26 and two receivers 27, 28 are used. The arrangement of FIG. 9 is particularly suitable where the measuring or transmitted beam portions 26' and 26" extend in parallel to each other and perpendicularly to the plane defined by the rail surface 16' as shown in FIG. 9.

By focussing the transmitted beams by respective optical lenses, it is assured that the beam will contact the wheel 25 in the so-called expectation range or zone 38 which is that part of the circumferential wheel surface where the beam should contact the wheel surface. This zone 38 is selected so that the optimal contact between the beam and the surface of the wheel is achieved to assure a high degree of repeatability of the measurements.

By arranging at least the beam generator or generators and the respective receivers on a carriage similar to that shown, for example in FIG. 17, and providing a distance measuring device that measures the displacement of the carriage, the wheel diameter can be directly ascertained and it is no longer necessary to calculate the speed of the wheel. The wheel would be stationary in such an instant while the carriage moves past the wheel.

It is further suggested to arrange the diameter measuring device in a measuring zone, whereby the beginning and the end of this measuring zone is marked by switching devices, for example in the form of light barrier beams L1, L2, for at least sensing the arrival of a wheel in the measuring zone. The switching devices are arranged in pairs. In other words, each wheel of a wheel set requires two sensing devices so that there is a total of four such sensing devices. Preferably, the sensing devices operate as contactless sensors or scanners T1, T4, T2, T3. The system also comprises the usual signal evaluating device and the time measuring device. The contactless sensors or scanners measure a fixed spacing and are arranged below the running surface 16' in defined sensing locations. The scanners are so located that the resulting defined sensing points on the wheel are all located substantially in a common plane corresponding to the respective central measuring plane 6, 17 of the wheel. The output signals provided by these sensors or scanners T1, T2, T3, T4 are supplied to the time measuring device 9 and to the evaluating device 8. These sensors or scanners T1 to T4 must be such that they are able to respond to the entrance and exit of a wheel into and out of the measuring zone. The sensors must be located in a fixed position so that the dimension of the wheel will not alter the fixed length of the measuring zone. Rather than using contactless sensors such as light beams, it would also be possible to mark the beginning and end of the measuring zone by a rail contact which is operated when the wheel rolls over the contact. The time between the operation of the inlet and outlet contacts or sensors is stored and then used in combination with the fixed distance of the measuring zone for calculating the speed of the wheel or the wheel set. Regardless, whether rail switches operated by the wheel or contactless sensors are used, the location of the switches or sensors is important. Contactless sensors may be arranged below the rolling plane so that they do not affect at all the rolling of the wheels through the measuring range.

The points of time when a contactless sensor responds are measured by the time measuring device and further evaluated by the signal evaluating device for forming a correction value or values for each scanning or sensing point. The correction values are calculated by multiplying the time difference between a response of the first sensor and the response of a second or further sensor, with the calculated speed. These correction values provide an information for adjusting the scanning point of the second and further sensors on the wheel surface, whereby the computer may form internally a correction scale for an optimal adaptation of the scanning points to a circle equation involving the three unknowns of the circle center position in the x- and y-directions and the radius. The respective calculations are performed iteratively in accordance with the Newton-Kantorowitsch method.

The sensors or contacts T1, T2, T3, T4 are so arranged that the respective sensing points P1, P2, P3, P4, please see FIG. 1C, are located within the measuring zone defined by the switching devices or sensors L1 and L2. This feature has the advantage that all measured data are available when the measuring distance between L1 and L2 has been traversed by the wheel. It would be possible to arrange the sensors T1 to T4 outside the measuring range. However, this type of arrangement would require more time and the measurement of the wheel speed would not be quite as accurate because there would not be an assurance that the wheels have the same speed or the same acceleration during the scanning by the sensors T1 to T4 as they had during the scanning for determining the speed or acceleration.

The end of the measuring distance could be marked by the spacing sensor T4. This is possible because the location of the measuring points of the contactless scanners or distance scanners is known so that the distance between the beginning of the measuring zone and the scanning point of the last scanner can be determined. The measuring of intermediate time periods in combination with the ascertainable distance between the beginning of the measuring zone and the particular sensing point can be used for ascertaining the wheel diameter and the wheel speed as described.

The scanners T1 to T4 could also be mounted on an axis extending perpendicularly to the plane of the drawing of FIG. 1C and thus perpendicularly to the measuring plane 6, 17 for tilting the respective distance sensor T1 to T4 to adjust the respective angle of incidence on the wheel surface, please see FIG. 1C. Means for fixing the scanner or sensor in an adjusted position should also be provided. These features make it possible to measure wheels having different diameters.

Preferably, the sensors T1 to T4 are photoelectric sensors adapted for recognizing an object at a fixed, adjusted distance. Such photoelectric sensors are standard shelf items and are known, for example, for positioning a work piece with a fixed spacing between a work piece surface and a given point. This point is then the scanning zone 38 on the surface of the wheel, whereby an electric signal is produced when the wheel passes through this point or zone 38. Such photoelectric switches are also suitable for the present purposes to provide a signal when the wheel circumferential surface arrives in the scanning point 38. Since the position of the scanning point 38 is thus defined and it is known where it is located in a fixed coordinate system, it can be ascertained where a respective area on the surface of the wheel is located at the time when the scanning takes place, whereby this area coincides with the respective signal. The reaction time of these photoelectric switches is sufficiently fast and precise at least when a wheel set rolls relatively slowly through the measuring range, whereby a sufficient repeatability of the measurement is assured.

It is possible to use for the measuring zone markers or switches L1, L2 so-called light barriers which have a sufficiently precise switching characteristic.

The distance sensors T1 to T4 are arranged for sensing the surface of a wheel in the measuring circle 10 at an angle from below in such a direction that the sensing direction 11 extends approximately perpendicularly to the tangent 12 at the measuring circle 10 in the sensing point P1 to P4. The measuring circle 10 extends in the central plane or measuring plane 6, 17 of the wheel. This feature avoids the blurring of the sensing beam where it contacts the wheel surface so that even where the wheel diameters vary the scanning or sensing is still sufficiently precise.

The device for measuring the profile or tread quality comprises a wheel support 58 which may be a rail section as shown in FIG. 10 for supporting the circumferential surface of a wheel to be scanned. The light source 60 of the wheel tread or profile quality sensing device produces a plane-parallel light beam 61 which is received by the imaging optical means shown in the left-hand part of FIG. 10 for example. These cameras 62 to 65 are producing analog signals which are preferably converted by an analog-to-digital converter circuit not shown, but forming part either directly of the respective camera with its imaging optical means or forming part of the central signal processing unit shown in FIG. 18. It is not important whether one wheel is being scanned or whether the components of the profile sensing device are provided in duplicate for scanning both wheels of a wheel set.

The profile or tread quality sensing device W has a light source 60 which illuminates a rail wheel 18 on one side of a measuring plane 71 in the zone of the wheel profile or tread with a light beam 61 which is as plane-parallel as possible. In such a device W a measuring distance 57 is fixed along an auxiliary track 58 and the light source 60 is arranged on one side of a measuring plane 59 extending perpendicularly to the track and coinciding with the longitudinal axis 86 of the wheel set. The light source is located in a fixed position relative to the length of the measuring distance 57 for producing the plane-parallel light beam 61. At least one camera 62 to 65 is arranged on the other side of the measuring position plane 59 for sensing the shadow image, whereby the camera is connected to the evaluating signal processing circuit as shown in FIG. 18. The evaluating circuit in turn is connected or connectable to an output device such as the image screen 66 or a plotter or the like or, it provides a control signal to a machine tool not shown.

The auxiliary track section 58 may be part of a regular rail track so that the complete train may roll with all its wheel sets through the measuring distance 57. It is preferable that the travelling speed through the profile sensing device W is relatively slow, for example 3 mph. On the other hand, the profile sensing device W may be arranged on a carrier for travelling along a rail section while the train is stationary.

In any event, the just described device W produces a shadow image which is sensed by at least one camera and which supplies the respective signals to a computer for processing. A self-adjusting circuit which controls its threshold value in a closed loop manner converts the analog signal produced by the respective camera into a binary digital signal which is initially processed for extracting from the binary signal the coordinate values of the wheel profile coordinates which are then stored in a computer memory. The computer addresses the memory in serial fashion for further processing of these signals and comparing the result with a set of rated reference data also stored in the computer. The result of the comparing is then supplied to an output, for example, in the form of a monitor or plotter for display showing a rated-actual contour. Where differences between the rated contour and the measured and sensed contour fall outside a permissible tolerance range, a control signal is provided to a machine tool for performing a truing operation on a wheel which has a contour outside the permissible contour. The wheel does not even have to be removed from the vehicle for the truing operation. However, the truing operation could be performed on a removed wheel. As long as the measured contour is within a permissible range relative to a reference or rated contour, it is not necessary for the plotter or display to continuously show the measured contour and it would be sufficient to plot test portions of the measured contour, for example, at predetermined time intervals.

The cameras 62 to 65 may be replaced by a single optical device comprising several arrays of sensors responsive to the received shadow image and driven by a common electronic driving circuit which may be separate from the sensing device W proper, however electronically connected thereto.

By using four cameras 62 to 65 for sensing four neighboring shadow image sections a higher sensing resolution is achieved without a correspondingly higher expenditure because it is possible to provide the electronic signal evaluating circuit with means for a parallel preliminary processing and means for an intermediate storage as well as means for the serial processing of the camera produced signals. Thus, although four cameras are being used, it is not necessary to provide the signal evaluating circuit components four times over. The required storage capacity and the required computer real time is advantageously low in such an arrangement.

The lighting source 60 is preferably equipped with a flash or strobe light for making a direct profile measuring possible. A continuous illumination may be used simultaneously for adjusting the components of the profile quality sensing device. The strobe light effect can further be achieved when the cameras are equipped with a short duration shutter or an equivalent structure exposing the cameras for short durations.

The light source 67 of each light source structure 60 is preferably arranged below the rolling plane 68, whereby a reflecting device 69 with its reflecting members 70 is located so that a wheel may roll over the reflecting device 69. Such arrangement still permits the proper sensing of the wheel profile while permitting the respective wheel to roll unimpeded along an auxiliary rail and over the reflecting device.

By arranging the light source so that the light beam 61 extends at an acute angle relative to the rolling plane 68, a respective acute angle $\alpha'$ is formed between the vertical measuring position plane 59 and a plane 71 extending perpendicularly to the light beam 61. This type of arrangement makes it possible to either mount the light source 60 or the carrier plate 83 for the cameras in a fixed position, thereby simplifying the apparatus. Preferably, the cameras are located in a fixed position below the measuring plane 68.

As mentioned, cameras 62 to 65 may be divided into two groups, whereby one group receives the light directly and the other group is so arranged that it receives its light through a semipermeable deflecting mirror 72 operating as a beam splitter for the light beam 61. This feature permits a very compact mounting of the cameras and as a result achieves a high resolution of the shadow image because it is thus possible to scan or sense sections which are located close enough to each other for a high resolution. It has been found that so-called charge coupled devices are very well suited as cameras for the present purposes because charge coupled devices are well suited for sensing the bright-dark boundaries produced by the present shadow image.

By activating the profile sensing device with a wheel operated switch, it is assured that the profile sensing device is ready for action at the latest when a wheel has reached the measuring position. Thus, the fully automatic operation of the present system is made possible while simultaneously assuring that scanning takes place when a wheel is actually in a position to be scanned.

The wheel illuminating light source 60 may be so arranged that it projects the light beam 61 toward an oncoming wheel as shown. However, the arrangement may also be such that the scanning light beam is projected onto the "back" of a wheel. These modifications provide for an easy adaptation of the profile sensing apparatus to particular local requirements.

A wheel or a wheel set is preferably supported by a pair of support rollers 76 which in turn are rotatably mounted on a support roller carrier 75, whereby the support roller pair is adjustable or movable perpendicularly to the plane parallel light beam 61. The support rollers 76 are arranged between the cameras 62 to 65 and the light source 60 in each measuring zone or distance 57. These rollers 76 make it possible to lift a wheel or wheel set off the auxiliary rail for precisely locating the spot to be scanned in the position where it is optimally scanned. Further, by rotating the wheel while its profile is being scanned, it is advantageous to make a plurality of measurements by the same profile quality sensing device without the need for arranging a plurality of such devices along a measuring station or zone. One or both of the support rollers 76 may be positively driven.

The cameras 62 to 65 and the illuminating device or light source 60 are preferably arranged on the support roller carrier 75 so that the light source and cameras are also lifted when the wheel is lifted. This feature has the advantage that the plane-parallel light beam 61 always retains the same position relative to the wheel supporting rollers 76. This position is known and therefore it is possible to provide data for calculating a wheel diameter because different wheel diameters would result in a different downward extension of the respective wheel between the two support rollers 76.

In order to measure widely varying wheel diameters it is desirable to mount the camera or cameras 62 to 65 and the light source 60 in a movable manner on the support roller carrier 75. The camera and/or light source should be adjustable at least in a vertical direction for adjusting the light beam 61 in each instance to the correct downward penetration of the particular wheel into the light beam regardless whether the wheel diameter is very large or very small. By arranging a sensor 77 centrally between the support rollers 76 for sensing the downward reach or extent of a wheel 18, it is possible to provide a signal for the adjustment either of the plane-parallel light beam or of the cameras to the respective downward extent of the particular wheel. Preferably, the sensor 77 is directly connected to an adjustment mechanism 78, 79, 80, 81 for adjusting the position of the camera or cameras and/or of the light source 60 to the downward extent of the particular wheel, whereby this adjustment is performed automatically.

Preferably, the profile or contour quality sensing device is mobile. For this purpose the support roller carrier 75 with its support roller pair 76 is arranged on a carriage movable in the longitudinal direction of the rail 82. At least one support roller carrier 75 comprises a sensor similar to the sensor 77 for ascertaining the lifted position of the wheel and thus of the wheel set. In this manner it is possible to keep the train running even though the wheel to be scanned is lifted. Merely the length of the measuring zone becomes longer in this instance because the carriage moves along with the train.

The measuring range or length 99 of a track in which a profile quality sensing device W is arranged for cooperation with the track, is provided with support means 112 such as a rail section forming part of the track and such support means are provided for each wheel of a wheel set. An illuminating device 102 equipped with optical means and two light sources 109 and 110 is arranged in such a position relative to a wheel that a so-called light section or light edge is produced at the circumferential surface of the wheel as best seen in FIG. 16. Thus, the illuminating device 102 is located below a plane 107 defined by the respective wheel support rail 112. The optical means include focussing lenses for the light sources 109 and 110 as well as digitizing circuits 103 to 106 for ascertaining the profile of the light section or of the light edge. The digitizing circuits 103 to 106 of the imaging or optical means are connected to a signal evaluating or processing circuit shown in FIG. 18. The signal evaluating device in turn is connected with an output unit 66 such as a display terminal. The evaluating or signal processing circuit also includes means for ascertaining at least the measuring position 100, 101 which in turn activate the profile sensing device. This construction integrates the profile sensing device into the track so that a complete train or a railroad car or even a single wheel set can pass through the profile sensing device. The illuminating device with its optical means is so arranged that the mentioned light section or light edge is formed and received by at least one camera for taking the image of the wheel profile or contour. In the measuring position the camera and the illuminating device 102 are synchronized with each other so that the illumination may be performed by a strobe which is flashed in the proper time sequence by the camera. However, where a continuous illumination is provided the camera could be activated only for the required short time duration to take the contour image, whereby the operation of the camera is controlled by the sensor which senses the presence of a wheel in the measuring position. The analog signals produced by the camera are digitized and supplied to a central processing computer which compares the digitized output of the camera representing measured values with the rated values forming a rated wheel profile stored in a memory of the computer. Such comparing establishes the difference between the rated profile and the measured profile to ascertain whether a wheel falls into or outside of an acceptable profile range. Here again a record may be made for each individual wheel or a control signal may be provided for operating a truing machine. The record may appear in the form of a print-out or on an image screen. The illuminating device is preferably so arranged that the light is projected onto the wheel profile with an acute angle relative to the motion direction of the wheel. With such an illumination it is not very critical that the wheel is precisely positioned at the time of the imaging.

By arranging the illuminating device 102 with its light sources and optical means in an adjustable manner on a carrier 115, it is possible to satisfy different requirements regarding the illuminating and imaging direction. Additionally, it is possible to adjust the illuminating device 102 with regard to wheels having different diameters if the illuminating direction is at an angle relative to the vertical. The optical means and the analog-to-digital converter for the signals produced by the optical means of the camera, may all form an integral unit. By guiding the light beam for illuminating the wheel profile perpendicularly to the plane of motion 107 and from below against the wheel profile, it is possible to place the light source itself in a location where there is space for the light source.

As shown in FIG. 17, the illuminating device 102 may be arranged directly vertically below the wheel 25 so that the light beam 116 is directed vertically upwardly against the measuring zone 100. In such an arrangement a camera or groups of cameras may be located on one side of the light beam direction as shown in FIG. 17, or cameras may be arranged on both sides of the direction of the light beam 116 for sensing the wheel profile. In case two cameras or two groups of cameras are provided, one on each side of the light beam direction, it is possible to form simultaneously two different profile images. If these profile images coincide with each other it is assured that the wheel was exactly in the measuring position. On the other hand, if the profile images differ from each other, the computer can calculate an interpolation between the two images.

Where the cameras are divided into two groups, it is desirable that one group of cameras receives the light whereas the other group of cameras receives the light through a deflecting device, whereby the light in each instance represents the light section or an image edge of a shadow image. Here again, the resolution is improved because closely neighboring profile sections can be imaged. Additionally, the arrangement can be more compact since the cameras may be located closely together. In any event, all the cameras may be stationary and located below the plane 107 along which the wheel travels, whereby the construction becomes very simple.

In order to avoid positioning errors by exactly positioning the profile sensing apparatus relative to the wheel it is preferable that the cameras and the illuminating device are mounted on a support structure which is equipped with a support roller carrier which in turn carries rotatably mounted support rollers for each wheel of a wheel set.

In another embodiment the support roller carrier with its wheel support rollers may be arranged for movement in the longitudinal direction of a track and for centering the support roller carrier relative to a wheel to be scanned. A carriage may be used for this purpose and the entire apparatus may travel along with a rail vehicle or train, thereby avoiding a stoppage altogether. While the wheel is rotating relative to the profile sensing device, the device itself is stationary relative to the wheel.

The arrangement of two light sources 109, 110 as shown in FIG. 16, which are displaced to the right and left of a central measuring plane in the direction of the wheel axle 111, and which are synchronized with each other, makes sure that any undesirable shadow effect that might be caused by any portion of the wheel profile, for example, the wheel flange, is avoided and that the wheel profile is completely illuminated for an accurate wheel profile sensing.

Where several cameras are used, each should image a different profile section and the evaluating circuit should be provided with circuits for a preliminary parallel processing of the signals received from the cameras, whereby these preliminarily processed signals are placed in an intermediate memory for a serial further processing. This arrangement provides a higher resolution precision and all the signals from all cameras can be processed by a single computer or central processing unit since the computer can handle the signals from the cameras in a serial fashion for assembling them to a complete profile. The mentioned preliminary processing and intermediate storage does not require any substantial circuit expenditure.

In order to minimize profile distortions, the angle between the direction of the illuminating light and the direction of the reflected light directed toward the cameras should be smaller than 90°, but not smaller than 60°. Further, the cameras and light source should be movably and adjustably arranged on a carrier for adjusting the position of these components relative to the diameter of a wheel to be measured as shown in FIG. 15. Thus, the same profile sensing device can be used for sensing wheel profiles of wheels having different diameters.

The reflected light beam 61 or 122 or 123, for example, could be introduced into a light conducting fiber for transmission to the respective camera. This feature makes it possible to place the cameras virtually in any desirable location and to select the number of the cameras freely in accordance with the desired resolution.

Figure 20:
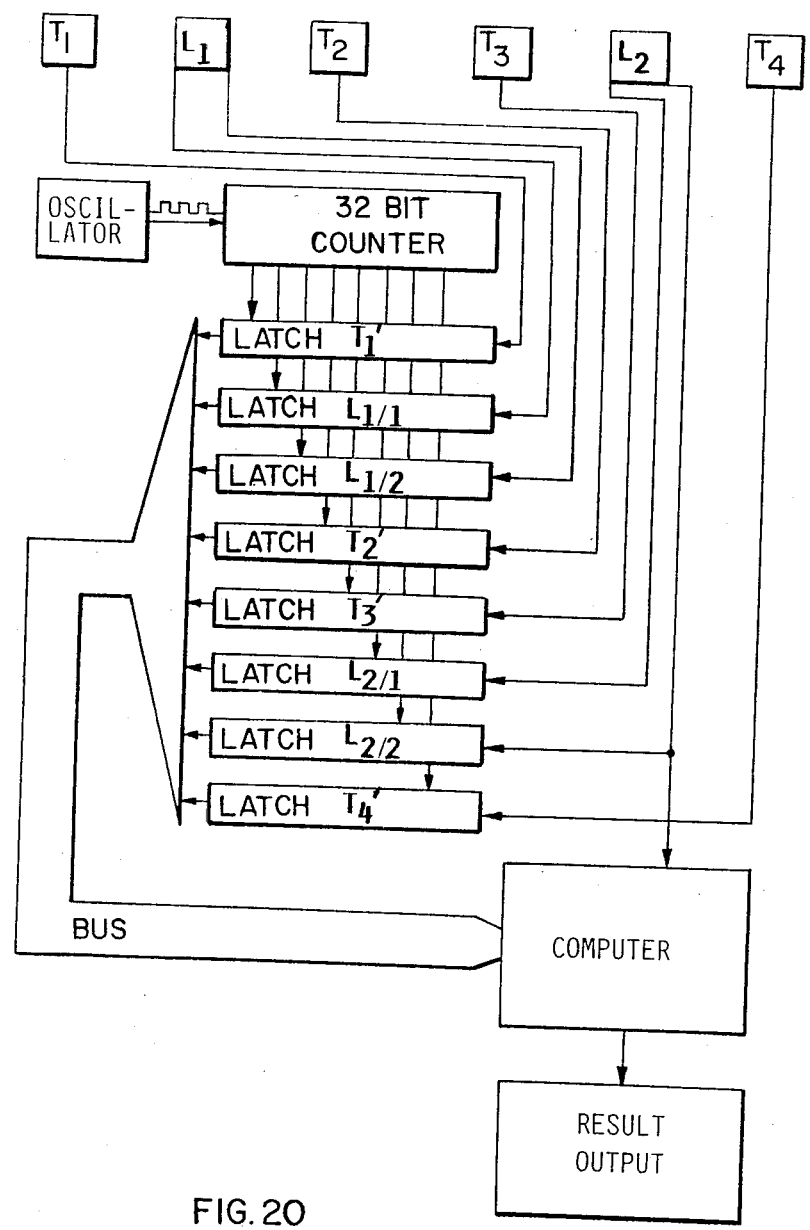
FIGS. 20 and 21 are diagrams for illustrating the function or operation of the present apparatus.

Referring to FIG. 20, the following program steps will be performed.

1. Example of function, FIG. 20

(1) The main switch is on, the apparatus is operational.

(2) The oscillator applies a clock signal to the counter. The counter runs, when the apparatus is operational, without interruption.

(3) A wheel reaches with its oncoming wheel flank the light barrier $L_1$. The oncoming wheel flank sets a time marker with the aid of the light barrier $L_1$. The time marker is stored in the latch circuit $L_1/_1$.

(4) The wheel leaves its outgoing wheel flank the light barrier $L_1$. The outgoing wheel flank sets a time marker with the aid of the light barrier $L_1$. This time marker is stored in the latch circuit $L_1/_2$.

(5) The outgoing wheel flank sets a time marker with the aid of the sensor $T_1'$. This time marker is stored in the latch circuit $T_1$.

(6) The outgoing wheel flank sets a time marker with the aid of the sensor $T_2'$. This time marker is stored in the latch circuit $T_2$.

(7) The incoming wheel flank sets a time marker with the aid of the sensor $T_3'$. This time marker is stored in the latch circuit $T_3$.

(8) The incoming wheel flank sets a time marker with the aid of the sensor $T_4$. This time marker is stored in the latch circuit $T_4'$.

(9) The wheel reaches with its incoming wheel flank the light barrier $L_2$. The incoming wheel flank sets a time marker with the aid of the light barrier $L_2$. This time marker is stored in the latch circuit $L_2/_1$.

(10) The wheel leaves with its outgoing wheel flank the light barrier $L_2$. The outgoing wheel flank sets a time marker with the aid of the light barrier $L_2$. This time marker is stored in the latch circuit $L_2/_2$.

(11) The time marker $L_2/_2$ instructs the computer that the measuring is completed.

(12) The data stored in the latch circuit memories are then read into the computer through the data bus. These data are the input parameters for the subsequent evaluation.

(13) The result appears at the result output which may be a printer, a plotter, or directly a machine tool.

Referring further to FIG. 20, the time marker setting sensors $T_1$, $T_2$, $T_3$, $T_4$ may be of the type WT30-02, WT30-12, or WT30-22, sold by the firm Siek. The light barriers L1, L2 may be of the type sold by the firm Omron. The clock oscillator may be of the type MTU clock 1 MHz sold by the firm Motorola. The counter may be a 32-bit counter of the integrated circuit type SN74LS160 sold by the firm National Semiconductor. The latch circuits forming a latch register may be of the type SN74LS374 sold by the firm National Semiconductor. The computer may be of the type SAM 68K sold by the firm KWS. The result output may be, for example, a printer of the type "pinwriter $P_2$" sold by the firm NEC with a conventional drive sold by the firm KWS.

Figure 21:
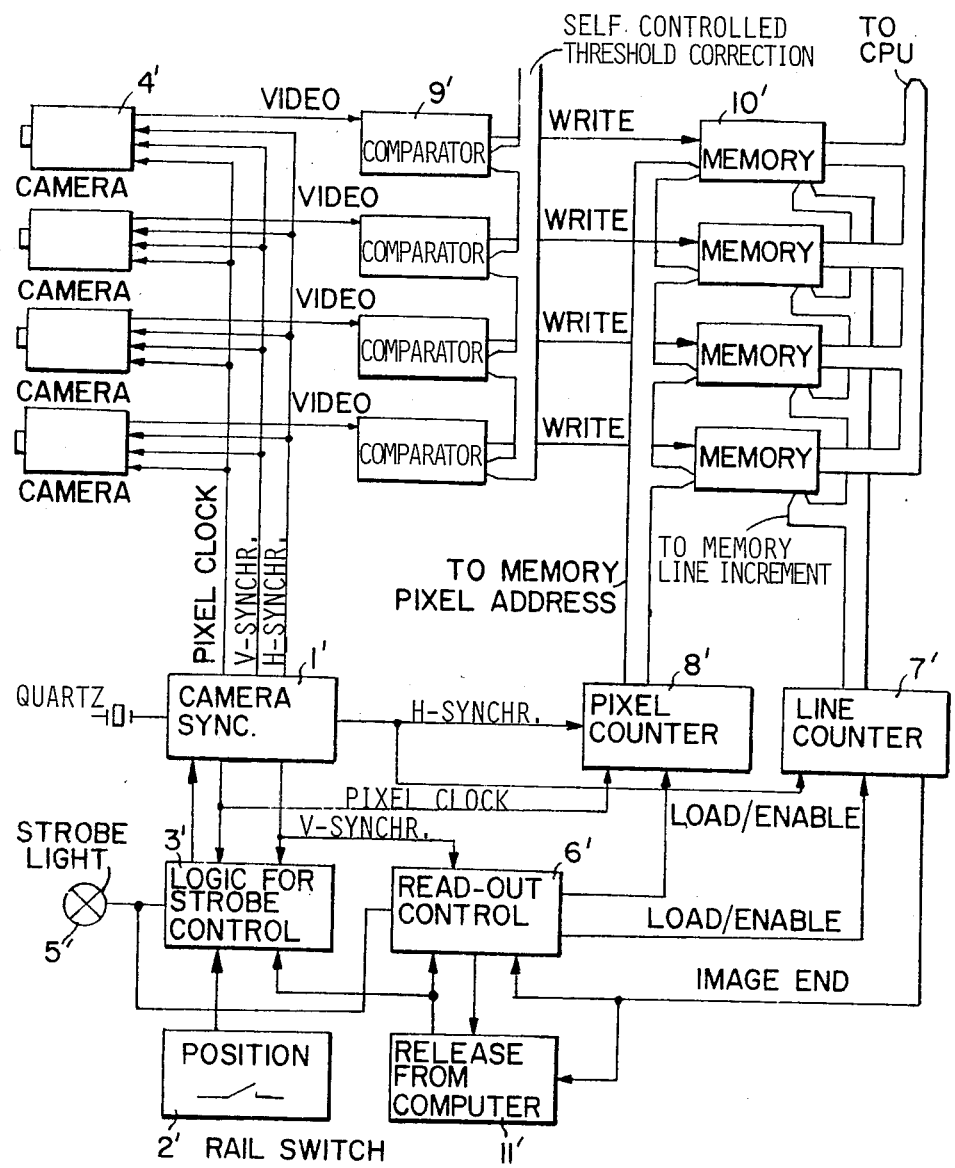

Referring to FIG. 21 a program for evaluating profile images which are taken by means of electronic cameras, will now be described.

(1) When the system is switched on, the camera synchronization 1' is continuously operational.

(2) When a wheel arrives, the rail switch 2' signals the presence of a wheel in the measuring position, to the logic for the strobe control 3'.

(3) The logic for the strobe control 3' makes, through the camera synchronization 1', the electronic camera 4' ready to take pictures.

(4) After the electronic camera 4' has sent, through the camera synchronization 1', a return signal to the logic for the strobe control 3', the latter triggers a strobe 5'.

(5) The strobe 5' generates in the electronic camera 4', through the optical means of the camera, a charge image of the illuminated profile, for example, on a CCD-array.

(6) Upon completion of taking the charge image the read-out of the image information may begin.

(7) For this purpose the read-out control 6', subsequent to the next vertical synchronization impulse of the camera synchronization 1', preadjusts the line counter 7' in accordance with the number of lines of the image and the pixel counter 8' in accordance with the pixel number of an image line.

(8) The camera synchronization 1' produces a pixel clock signal supplied: (a) to the electronic camera 4' to cause a linewise scanning of the charge image for producing the video signal, and (b) as a count impulse for producing a digital information for the image content (see step 12 below) in accordance with the respective count in the pixel counter 8'.

(9) The H-synchronization (Horizontal synchronization) caused by the camera synchronization 1' is supplied to:
(a) the electronic camera 4' to cause the scanning of the respective next image line,
(b) line counter 7' as a counting impulse to form the storage addresses for the image content (see step 12 below) corresponding to the respective count, and
(c) as a reset and loading instruction to the pixel counter 8'.

(10) The V-synchronization (Vertical synchronization) produced by the camera synchronization 1' is supplied to:
(a) the electronic camera 4' to cause the dark switching for the image return run,
(b) the strobe control 3' as a release signal for the next image taking, and
(c) the read-out control 6' as a start triggering signal.

(11) The video signal from the camera 4' is supplied to the preliminary processing in the comparator 9'. The comparator 9' performs the following steps:
(a) analog signal processing, for example amplification, black value fixation,
(b) separating the H and V-synchronizing signals from the video signal so that an image content signal remains,
(c) producing a binary (black/white) signal from the image content signal (gray image) by comparing with a self-controlling threshhold (comparator).

(12) For each image line the comparator 9' supplies a write instruction to the buffer memory 10' in response to a black-white transition providing a respective status change comparator output signal, whereby the buffer memory 10' stores the instantaneous contents of the pixel counter 8' at the address defined by the line counter 7'.

(13) Thus, the time of an image end of the location of the black-white transition for each image line is stored as a numerical value in the buffer memory 10'. The central processing computer receives a release 11' and can interrogate the buffer memory for evaluating the image content.

(14) If, for the above stated reasons several, for example four, electronic cameras are used, the number of the comparators as well as of the buffer memories 10' increases respectively. The processing of the video signals in accordance with steps (11), 12) and 13) takes place in parallel, that is, simultaneously. The access of the controlling central processing computer to the numerical values stored in the buffer memory 10' may take place in a serial manner for evaluating the image content.

Although the invention has been described with reference to specific example embodiments, it will be appreciated, that it is intended to cover all modifications and equivalents within the scope of the appended claims.

What we claim is:

1. An apparatus for measuring of wheels of rail vehicles, comprising a measuring range (X) provided along a rail track and having auxiliary rails (2, 16, 58, 112) forming running surfaces (2', 16', 68, 107) for said wheels, at least one wheel diameter measuring device (U) located in said measuring range for providing first electrical signals suitable for ascertaining the diameter of a wheel or wheels, a wheel tread profile sensing device (W) located in said measuring range (X) for providing second electrical signals suitable for ascertaining the quality of a wheel tread profile, wherein both devices (U and W) perform their function during a relative motion between the respective wheel (1, 18, 25) and the measuring apparatus, and data processing signal evaluating means connected to both devices (U, W) for providing an information output regarding the wheel diameter and regarding the wheel tread profile quality.

2. The apparatus of claim 1, further comprising wheel cleaning means (V) arranged in said measuring range upstream of one of said devices (W, U), as viewed in a relative motion direction, for cleaning a portion of the circumferential surface of a wheel.

3. The apparatus of claim 2, wherein said cleaning means (V) are arranged for moving with a wheel along the measuring range (X).

4. The apparatus of claim 1, further comprising carrier means (2) for each wheel the diameter (d) of which is to be measured in a wheel diameter measuring plane (6, 17) by said diameter measuring device which comprises means for generating at least two electromagnetic beams (26', 26") having a wave length in the range of 200 to 2000 nm, said electromagnetic beams extending in positions for measuring said wheel diameter (d), said beams (26', 26") having a basic spacing (c) from each other in said diameter measuring plane (6, 17), means for moving said beam generator means in said diameter measuring plane (6, 17) relative to the wheel and in a direction extending perpendicularly to the beam direction while maintaining said basic spacing (c) between the two beams (26', 26"), receiver means (27, 28) comprising receiver optical means arranged for sensing radiation (34) which is retransmitted when said beams contact the circumferential surface of a wheel in a tangential manner, said data processing signal evaluating means comprising a time measuring device (22) and a signal evaluating device (35) connected to said receiver means (27, 28) for providing first wheel diameter representing electrical signals for calculating a wheel diameter.

5. The apparatus of claim 4, wherein said carrier means for each wheel of a wheel set comprise a rail (2, 16, 58, 112) defining a running surface (2', 16', 68, 107), and wherein said means for generating the electromagnetic beams comprise at least two laser beam generators.

6. The apparatus of claim 5, wherein said means for generating said electromagnetic beams comprise a plurality of laser beam generators, and wherein said receiver means comprise respective laser light receivers arranged displaced relative to each other so that the respective transmitted laser beams extend at a spacing (X', X") from each other in the direction of relative movement.

7. The apparatus of claim 6, wherein said spacing (X', X") is smaller than said basic distance (c).

8. The apparatus of claim 4, wherein said means for generating said electromagnetic beams (22, 29, 29', 45 to 50) comprise beam generators located at known spacings (Sq and X') from one another and arranged at a known spacing (Hq) from a running surface (2', 16') defined by said carrier means (2), wherein said beam generators and said receiver means (42, 43, 42', 51 to 56) are divided into two groups by a plane (P) extending perpendicularly to said running plane surface and coinciding with a wheel set axle (36), whereby said electromagnetic beams are so tilted that each beam (22, 45 to 47) of one group beam generators extends in a diverging manner relative to the beams (29, 29', 48 to 50) of the other group.

9. The apparatus of claim 8, wherein said dividing plane (P) is a bi-sector of an angle enclosed by said diverging beams.

10. The apparatus of claim 9, wherein the beams of one group of beam generators (45 to 47, 48 to 50, 28, 29') extend in parallel to one another.

11. The apparatus of claim 10, wherein an inlet group comprises at least one laser beam generator (22) and a respective receiver optical means (43), and wherein an outlet group comprises at least two laser beam generators (29, 29') with the respective receiver optical means (42, 42'), said inlet group providing wheel diameter related signals prior to said outlet group providing wheel diameter related signals.

12. The apparatus of claim 11, wherein said laser beam generators are assembled in groups (20, 20') forming beam transmitter modules (20, 20', 21).

13. The apparatus of claim 12, further comprising means for tiltably mounting at least one laser beam generator to permit a position adjusting tilting about an axis (30), and means for locking said laser beam generator into a fixed, adjusted position.

14. The apparatus of claim 4, further comprising means (31) for beam splitting and means (32) for deflecting at least one beam (37) so that one beam generator can provide a number of beams.

15. The apparatus of claim 4, wherein said beam generator means comprise means for focussing each beam so that the focus of the beam is located in an expectation zone (38) where it is expected that the beam will contact a wheel (25).

16. The apparatus of claim 4, further comprising carriage means for mounting at least the beam generator means (26', 26") and the respective receiver means (27, 28) on said carriage means (42"), distance measuring means (43', 44') arranged for cooperation with said carriage means for measuring a distance relevant to calculating a wheel diameter, and means for connecting said distance measuring means to said signal evaluating means for providing distance related signals to said signal evaluating means.

17. The apparatus of claim 1, further comprising means (L1, L2) for marking a beginning and an end of a measuring distance, said marking means (L1, L2) sensing the arrival of a wheel (1) in the measuring distance, said apparatus further comprising for each wheel contactless spacing sensor means (T1, T4; T2, T3) arranged below a wheel support plane for defining sensing points (P1 to P4) located substantially in a common wheel measuring plane (6), said data processing signal evaluating means further comprising an evaluating device (8) and a time measuring device (9) connected to receive signals from said spacing sensor means for calculating a wheel diameter.

18. The apparatus of claim 17, wherein said contactless spacing sensor means (T1 to T4) are so arranged that said sensing points (P1 to P4) are located between the beginning and the end of the measuring distance marked by said marking means (L1, L2).

19. The apparatus of claim 17, wherein said contactless spacing sensor means comprise a contactless spacing sensor member (T4) for marking the end of said measuring distance.

20. The apparatus of claim 17, wherein the contactless spacing sensor means (T1 to T4) are arranged for tiling about an axis (5) extending perpendicularly to said common wheel measuring plane (6), and wherein said contactless sensor means (T1 to T4) are fixable in a tilted position.

21. The apparatus of claim 17, wherein all of said contactless spacing sensor means (T1 to T4) are photoelectric switches for recognizing an object at a fixed distance to which said contactless spacing sensor means are adjusted.

22. The apparatus of claim 18, wherein said marking means (L1, L2) for determining the beginning and end of the measuring distance are constructed as so-called light barriers producing barrier light beams.

23. The apparatus of claim 17, wherein said contactless spacing sensor means (T1 to T4) are so arranged that they sense the surface of a wheel in a measuring circle (10) from below and at a slant having such a direction that a main sensing direction (11) extends approximately perpendicular to a tangent (12) through one of said sensing points on said measuring circle (10).

24. The apparatus of claim 1, comprising wheel support means (58) arranged for cooperation with said wheel tread profile sensing device and for supporting a wheel at its circumferential surface, said wheel tread profile sensing device further comprising light source means (60) for producing a plane parallel light beam (61), imaging optical means (62 to 65) arranged for receiving the plane parallel light beam (61), and digitizing means, said imaging optical means being connected to said digitizing means which in turn are connected to said data processing signal evaluating means for evaluating digitized signals representing the wheel tread profile quality as measured by said imaging optical means.

25. The apparatus of claim 24, wherein said imaging optical means comprise an eletronic camera, and wherein said digitizing means comprise circuit components which are part of said electronic camera (62 to 65).

26. The apparatus of claim 1, wherein said wheel tread profile quality sensing device (W) comprises a light source means (60) for producing a substantially plane parallel light beam (61) for illuminating a surface portion of a rail wheel on one side of a first measuring plane (71), said wheel tread profile sensing device (W) further including means for evaluating a shadow image produced by said plane parallel light beam (61), said apparatus further comprising an auxiliary track (58) arranged along a measuring distance (57), and wherein said light source means (60) is arranged on one side of a second vertical measuring plane (59) extending perpendicularly to said auxiliary track and coinciding with a wheel axis (86) in a fixed position relative to the length of the measuring distance (57), and electronic camera means (62, 63, 64, 65) arranged on the other side of said second measuring plane (59) for sensing a shadow image produced by said light beam (61), said electronic camera means being connected to said data processing signal evaluating means (FIG. 18) for supplying said second wheel tread quality representing signals to said data processing signal evaluating means, and output means connected to said data processing signal evaluating means for providing wheel quality representing output signals.

27. The apparatus of claim 26, wherein said electronic camera means comprise four cameras (62 to 65) for sensing four neighboring shadow image sections, and wherein said data processing signal evaluating means comprise electronic circuits for a parallel preliminary signal processing of signals from said cameras, and memory means for an intermediate storage, and means for the serial processing of preliminarily processed camera signals.

28. The apparatus of claim 27, wherein said light source means comprise a flashlight device.

29. The apparatus of claim 28, wherein said light source means (60) are arranged below a rolling plane (68) for said wheels, and wherein a deflection device (69) having a deflecting member (70) for deflecting light from said light source means, is hinged to said light source means (60) so that a wheel may roll over the deflection device (69).

30. The apparatus of claim 29, wherein said light source means (60) is so constructed and arranged that said first measuring plane (71) which extends perpendicularly to said plane parallel light beam (61) forms an acute angle (α) with said second vertical measuring plane (59).

31. The apparatus of claim 30, wherein said four cameras (62 to 65) are arranged in a stationary position below said rolling plane (68).

32. The apparatus of claim 31, comprising two groups (64, 65, 62, 63) of cameras, one camera group (62, 63) being oriented in the direction of said plane parallel light beam (61), and another camera group (64, 65) being oriented at an angle to said plane parallel light beam (61), wherein the latter camera group (64, 65) comprises a semipermeable mirror (72) arranged to operate as a beam splitter for said plane parallel light beam (61) for passing light simultaneously to both camera groups.

33. The apparatus of claim 32, wherein all cameras (62 to 65) are cameras of the so-called charge coupled device type (CCD).

34. The apparatus of claim 33, further comprising a switching device (73) arranged to be actuated by a wheel, said switching device (73) activating the apparatus at the latest when a wheel has reached a measuring position.

35. The apparatus of claim 34, wherein said light source means (60) is arranged in such a way that the respective light is directed toward an oncoming wheel.

36. The apparatus of claim 34, wherein said light source means (60) is so arranged that the back of a wheel passing throught the measuring range is illuminated.

37. The apparatus of claim 27, further comprising a pair of support rollers (76) for rotatably supporting each wheel of a wheel set, support roller carrier means (75) for mounting said support rollers (76), and means for adjusting said support rollers for moving perpendicularly to said plane parallel light beam (61), said support roller pair being arranged between said cameras (62 to 65) and said light source means (60) of each measuring distance (57).

38. The apparatus of claim 37, wherein said electronic camera means (62 to 65) and said light source means (60 are arranged on said support roller carrier means (75).

39. The apparatus of claim 38, wherein said electronic camera means (62 to 65) and said light source means (60) are mounted on said support roller carrier means (75) in a movable and vertically adjustable manner.

40. The apparatus of claim 39, further comprising sensor means (77) arranged about centrally between said support rollers (76), for sensing a downward reach of a wheel (25).

41. The apparatus of claim 40, further comprising a camera position adjustment mechanism, said sensor means (77) being connected with said adjustment mechanism (78, 79, 80, 81) for adjusting the position of said electronic camera means (62 to 65) and the position of said light source means (60) to said downward reach of a wheel.

42. The apparatus of claim 41, wherein each support roller carrier means (75) with its pair of support rollers (76) is arranged to be movable in the longitudinal direction of said auxiliary track, and wherein at least one support roller carrier means (75) provided for a wheel (25) of a wheel set comprises a device for ascertaining a lifted position of a wheel (25) and thus of the wheel set.

43. The apparatus of claim 1, wherein said wheel tread profile sensing device comprises support means (112) for each wheel (25) of a wheel set in said measuring range (99), said wheel tread profile sensing device further comprising an illuminating device (102) including optical means arranged for producing a light edge at the circumferential surface of the wheel (25), said illuminating device being arranged below a plane (107) of the respective support means (112), an imaging optical means arranged for receiving light from said illuminating device (102), said imaging optical means comprising digitizing means (103 to 106) for ascertaining the profile of said light edge, said data processing signal evaluating means including a signal evaluating device and an output unit, wherein said digitizing means (103 to 106) of said imaging optical means is connected to said signal evaluating device having an output connected to said output unit (66), said signal evaluating device comprising means for ascertaining at least a measuring position (100, 101) for activating the apparatus.

44. The apparatus of claim 43, wherein said illuminating device (102) is so constructed and arranged that the tread profile of the wheel (25) is illuminated at an acute angle to the direction of movement (114) of said wheel.

45. The apparatus of claim 44, wherein said illuminating device (102) comprises an imaging optical means and a carrier for said imaging optical means arranged on said carrier (115) in an adjustable manner, said imaging optical means and said digitizing means forming an electronic camera (103–106).

46. The apparatus of claim 43, further comprising means for guiding a light beam (116) for illuminating the tread profile of a wheel perpendicularly to a plane of motion (107) and from below against the tread profile of a wheel.

47. The apparatus of claim 46, wherein illuminating device is located below the plane (107) for each wheel for producing a light section by means of a light beam (116) which is directed vertically against the tread profile of the wheel, said wheel tread profile sensing device further comprising a camera located in the direction of the relative motion (114) between the wheel (25) and the apparatus, on both sides of a light beam produced by said illuminating device for ascertaining the tread profile of a wheel.

48. The apparatus of claim 43, wherein said imaging optical means of said wheel tread profile sensing device comprises light deflecting means and a plurality of cameras (103, 104, 105, 106) arranged to form several camera groups, one group (103, 104) being directed to receive light from said light edge, and wherein another group (105, 106) of cameras is arranged to receive light from said light edge through said light defleting means (117).

49. The apparatus of claim 48, wherein all cameras are arranged in a stationary position below a plane (107) along which a wheel moves.

50. The apparatus of claim 49, wherein said cameras (103 to 106) and said illuminating device (102) for each measuring range (99) are mounted on said support means having at least one vertically movable (118) support roller carrier (119) including a rotatably mounted support roller pair (120) for rotatably supporting each wheel.

51. The apparatus of claim 50, wherein each support roller carrier (119) with its support roller pair (120) is arranged for movement in the longitudinal rail direction (121), said apparatus further compirsing means for centering said roller carrier relative to a wheel to be measured.

52. The apparatus of claim 51, wherein said illuminating device comprises two light sources (109, 110) which are displaced in the direction of an axis of a wheel set (111) and which are synchronized with each other.

53. The apparatus of claim 52, wherein said wheel tread profile sensing device comprises several cameras (103 to 106) of which each camera picks up another wheel tread profile portion, and wherein said data processing signal evaluating means connected with the cameras, comprise devices (97) for the intermediate storage and for a preliminary serial processing of signals provided by said cameras.

54. The apparatus of claim 53, wherein an angle ($\alpha, \beta$) between the light beam from said illuminating device (116) and a received light beam (122, 123) is within a range of 60° to smaller than 90°.

55. The apparatus of claim 53, further comprising carrier means for said cameras (103 to 106) and for said illuminating device (102) which are movably and adjustably arranged on said carrier (124) for adjustment depending on the diameter of the wheel to be measured.

56. The apparatus of claim 55, further comprising light conducting fibers for supplying radiated light to said cameras (103 to 106) through said light conducting fibers which have image retaining qualities.

* * * * *

UNITED STATES PATENT AND TRADEMARK OFFICE
CERTIFICATE OF CORRECTION

PATENT NO. : 4,798,963  Page 1 of 2
DATED : January 17, 1989
INVENTOR(S) : Helmut Wittkopp et al.

It is certified that error appears in the above-identified patent and that said Letters Patent is hereby corrected as shown below:

In the title [54], line 3, replace "WHEEL" by --WHEELS--;

In the drawings, Sheet 3 should show Fig. 2 and all following Sheets should be renumbered correspondingly;
Claim 20, line 3, (column 36, line 20), replace "tiling" by --tilting--;
Claim 26, line 2, (column 36, line 60), delete --a--;
Claim 36, line 3, (column 37, line 67), replace "throught" by --through--;
Claim 48, line 8, (column 39, line 20), replace "defleting" by --deflecting--;
Claim 51, line 4, (column 40, line 4), replace "compirsing" by --comprising--.

Signed and Sealed this

Twelfth Day of September, 1989

Attest:

DONALD J. QUIGG

*Attesting Officer*  *Commissioner of Patents and Trademarks*